US008943553B2

(12) United States Patent
Torigoshi et al.

(10) Patent No.: US 8,943,553 B2
(45) Date of Patent: Jan. 27, 2015

(54) INFORMATION PROCESSING APPARATUS, CONTENT MANAGEMENT METHOD, AND COMPUTER-READABLE NON-TRANSITORY RECORDING MEDIUM ENCODED WITH CONTENT MANAGEMENT PROGRAM

(75) Inventors: Akihiro Torigoshi, Amagasaki (JP); Keisuke Teramoto, Itami (JP); Takeshi Morikawa, Takarazuka (JP); Masami Yamada, Sennan-gun (JP); Atsushi Ohshima, Amagasaki (JP)

(73) Assignee: Konica Minolta, Inc., Tokyo (JP)

( * ) Notice: Subject to any disclaimer, the term of this patent is extended or adjusted under 35 U.S.C. 154(b) by 95 days.

(21) Appl. No.: 13/046,512

(22) Filed: Mar. 11, 2011

(65) Prior Publication Data

US 2011/0231906 A1    Sep. 22, 2011

(30) Foreign Application Priority Data

Mar. 19, 2010    (JP) .................................. 2010-064921

(51) Int. Cl.
  *G06F 21/00*    (2013.01)
  *G06F 21/60*    (2013.01)
  (Continued)

(52) U.S. Cl.
  CPC .......... *G06F 21/608* (2013.01); *G06F 21/6218* (2013.01); *H04N 1/00127* (2013.01); *H04N 1/00222* (2013.01); *H04N 1/2179* (2013.01); *H04N 2201/3205* (2013.01)
  USPC ............ 726/4; 726/2; 726/3; 726/26; 726/27; 726/28; 705/51

(58) Field of Classification Search
  CPC ....... G06F 21/60; G06F 21/62; G06F 21/608; G06F 21/6218; H04N 1/2179; H04N 1/127; H04N 1/222; H04N 2201/3205

USPC ........................ 726/2, 3, 4, 26, 27, 28; 705/51
  See application file for complete search history.

(56) References Cited

U.S. PATENT DOCUMENTS 7,937,422 B1 *  5/2011  Ferguson, Jr. .................. 707/828
8,631,236 B2 *  1/2014  Bugenhagen ................. 713/165
(Continued)

FOREIGN PATENT DOCUMENTS

CN    101008967    8/2007
CN    101243434    8/2008
(Continued)

OTHER PUBLICATIONS

Notice of Ground of Rejection mailed Feb. 28, 2012, directed to Japanese Application No. 2010-064921; 6 pages.
(Continued)

*Primary Examiner* — Christopher Revak
*Assistant Examiner* — Sarah Su
(74) *Attorney, Agent, or Firm* — Osha Liang LLP

(57) ABSTRACT

An information processing apparatus includes: a storage portion having a plurality of storage areas; an authentication portion for authenticating a user; a content setting portion for storing content set public by the authenticated user in a public storage area with no access restriction, of the plurality of storage areas of the storage portion, and for storing content set private into a personal storage area accessible only by the authenticated user, of the plurality of storage areas of the storage portion; and an access permission portion for, when a predetermined process is executed on the content set private stored in the personal storage area, making the content set private accessible by others through the public storage area.

12 Claims, 12 Drawing Sheets

(51) Int. Cl.
*G06F 21/62* (2013.01)
*H04N 1/00* (2006.01)
*H04N 1/21* (2006.01)

(56) References Cited

U.S. PATENT DOCUMENTS

| | | | |
|---|---|---|---|
| 2002/0087435 | A1 | 7/2002 | Neishi et al. |
| 2003/0023677 | A1* | 1/2003 | Morison Zuill et al. ...... 709/203 |
| 2003/0140241 | A1 | 7/2003 | England et al. |
| 2004/0093397 | A1* | 5/2004 | Chiroglazov et al. ......... 709/219 |
| 2005/0182773 | A1* | 8/2005 | Feinsmith ..................... 707/100 |
| 2005/0198291 | A1 | 9/2005 | Hull et al. |
| 2006/0293956 | A1* | 12/2006 | Walker et al. ................... 705/14 |
| 2007/0039055 | A1 | 2/2007 | Plastina et al. |
| 2007/0253013 | A1* | 11/2007 | Shudo .......................... 358/1.14 |
| 2009/0025086 | A1 | 1/2009 | Fujita et al. |
| 2009/0100109 | A1* | 4/2009 | Turski et al. .................. 707/200 |
| 2009/0125605 | A1* | 5/2009 | Chung .......................... 709/217 |
| 2009/0293118 | A1* | 11/2009 | Yan et al. ........................ 726/19 |
| 2009/0327718 | A1* | 12/2009 | Hirai ............................. 713/168 |
| 2010/0042782 | A1* | 2/2010 | Grynberg ...................... 711/115 |
| 2010/0115201 | A1* | 5/2010 | Hsu ............................... 711/115 |
| 2011/0035503 | A1* | 2/2011 | Zaid et al. ..................... 709/228 |
| 2011/0040965 | A1* | 2/2011 | Feezel et al. .................. 713/156 |
| 2011/0138487 | A1* | 6/2011 | Cohen et al. ................... 726/32 |
| 2012/0221853 | A1 | 8/2012 | Wingert et al. |
| 2012/0233490 | A1* | 9/2012 | Barton et al. ................. 713/503 |
| 2013/0117860 | A1* | 5/2013 | Gnech et al. .................... 726/28 |
| 2014/0047507 | A1* | 2/2014 | Chang et al. ...................... 726/3 |

FOREIGN PATENT DOCUMENTS

| | | | |
|---|---|---|---|
| CN | 101297300 | 10/2008 | |
| GB | 2444339 A | * 6/2008 | ............... H04L 9/32 |
| JP | 8-161214 | 6/1996 | |
| JP | 2002-108718 | 4/2002 | |
| JP | 2002-170070 | 6/2002 | |
| JP | 2003-259306 | 9/2003 | |
| JP | 2005-32238 | 2/2005 | |
| JP | 2006-202012 | 8/2006 | |
| JP | 2010-41500 | 2/2010 | |

OTHER PUBLICATIONS

Office Action dated May 13, 2013, directed to Chinese Patent Application No. 201110067419.5; 11 pages.

* cited by examiner

INFORMATION PROCESSING APPARATUS, CONTENT MANAGEMENT METHOD, AND COMPUTER-READABLE NON-TRANSITORY RECORDING MEDIUM ENCODED WITH CONTENT MANAGEMENT PROGRAM

This application is based on Japanese Patent Application No. 2010-064921 filed with Japan Patent Office on Mar. 19, 2010, the entire content of which is hereby incorporated by reference.

BACKGROUND OF THE INVENTION

1. Field of the Invention

The present invention relates to an information processing apparatus, a content management method, and a computer-readable non-transitory recording medium encoded with a content management program. More particularly, the present invention relates to an information processing apparatus for managing contents accessed by a plurality of users, a content management method executed in the information processing apparatus, and a computer-readable non-transitory recording medium encoded with a content management program.

2. Description of the Related Art

In meetings, for example, images of prepared materials are projected on screens and used in presentations. In recent years, presentation materials are often stored in a personal computer (PC) used by a presenter. A projector, for example, as a display device is connected to the PC so that the projector displays images of the materials output by the computer. On the other hand, meeting participants receive at their PC the display data sent from the PC of the presenter so that the same image as the image displayed by the projector appears on their PC.

For example, Japanese Patent Laid-Open No. 2002-170070 discloses a presentation material publishing system including a presenter, a reader, and a presentation material publishing server that can be accessed by the presenter and the reader via a network. The presentation material publishing server can store presentation materials uploaded from the presenter via the network in such a manner as to be associated with public information, and has the right to permit the browsing of the presentation materials by the reader which has accessed them via the network. The presenter can register predetermined public information in the presentation material publishing server via the network and can upload the presentation materials in such a manner as to be associated with the public information. The reader can browse the presentation materials permitted by the presentation material publishing server via the network.

However, the conventional presentation material publishing system can change whether to enable browsing of presentation materials or not only by changing the right to permit the browsing. Therefore, although whether to enable browsing of presentation materials can be changed for each reader, to enable browsing only for a predetermined period requires changing the right to permit the browsing. Unfortunately, this operation is complicated. For materials including highly confidential information, in particular, a time period in which browsing is allowed should be shorter.

SUMMARY OF THE INVENTION

The present invention is made to solve the aforementioned problem, and an object of the present invention is to provide an information processing apparatus that facilitates an operation of changing a state in which contents cannot be accessed by others to a state in which they can be accessed.

Another object of the present invention is to provide a content management method that facilitates an operation of changing a state in which contents cannot be accessed by others to a state in which they can be accessed.

A further object of the present invention is to provide a computer-readable non-transitory recording medium encoded with a content management program that facilitates an operation of changing a state in which contents cannot be accessed by others to a state in which they can be accessed.

In order to achieve the above-noted object, in accordance with an aspect of the present invention, an information processing apparatus includes: a storage portion having a plurality of storage areas; an authentication portion to authenticate a user; a content setting portion to store content set public by the authenticated user into a public storage area with no access restriction, of the plurality of storage areas of the storage portion, and to store content set private into a personal storage area accessible only by the authenticated user, of the plurality of storage areas of the storage portion; and an access permission portion to, when a predetermined process is executed on the content set private stored in the personal storage area, make the content set private accessible by others through the public storage area.

In accordance with another aspect of the present invention, a content management method executed in an information processing apparatus including a storage portion having a plurality of storage areas includes the steps of: authenticating a user; storing content set public by the authenticated user into a public storage area with no access restriction, of the plurality of storage areas of the storage portion; storing content set private by the authenticated user into a personal storage area accessible only by the authenticated user; and when a predetermined process is executed on the content set private stored in the personal storage area, making the content set private accessible by others through the public storage area.

In accordance with a further aspect of the present invention, a computer-readable non-transitory recording medium is encoded with a content management program executed in a computer which controls an information processing apparatus including a storage portion having a plurality of storage areas. The content management program causes the computer to execute the steps of: authenticating a user; storing content set public by the authenticated user into a public storage area with no access restriction, of the plurality of storage areas of the storage portion; storing content set private by the authenticated user into a personal storage area accessible only by the authenticated user; and when a predetermined process is executed on the content set private stored in the personal storage area, making the content set private accessible by others through the public storage area.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
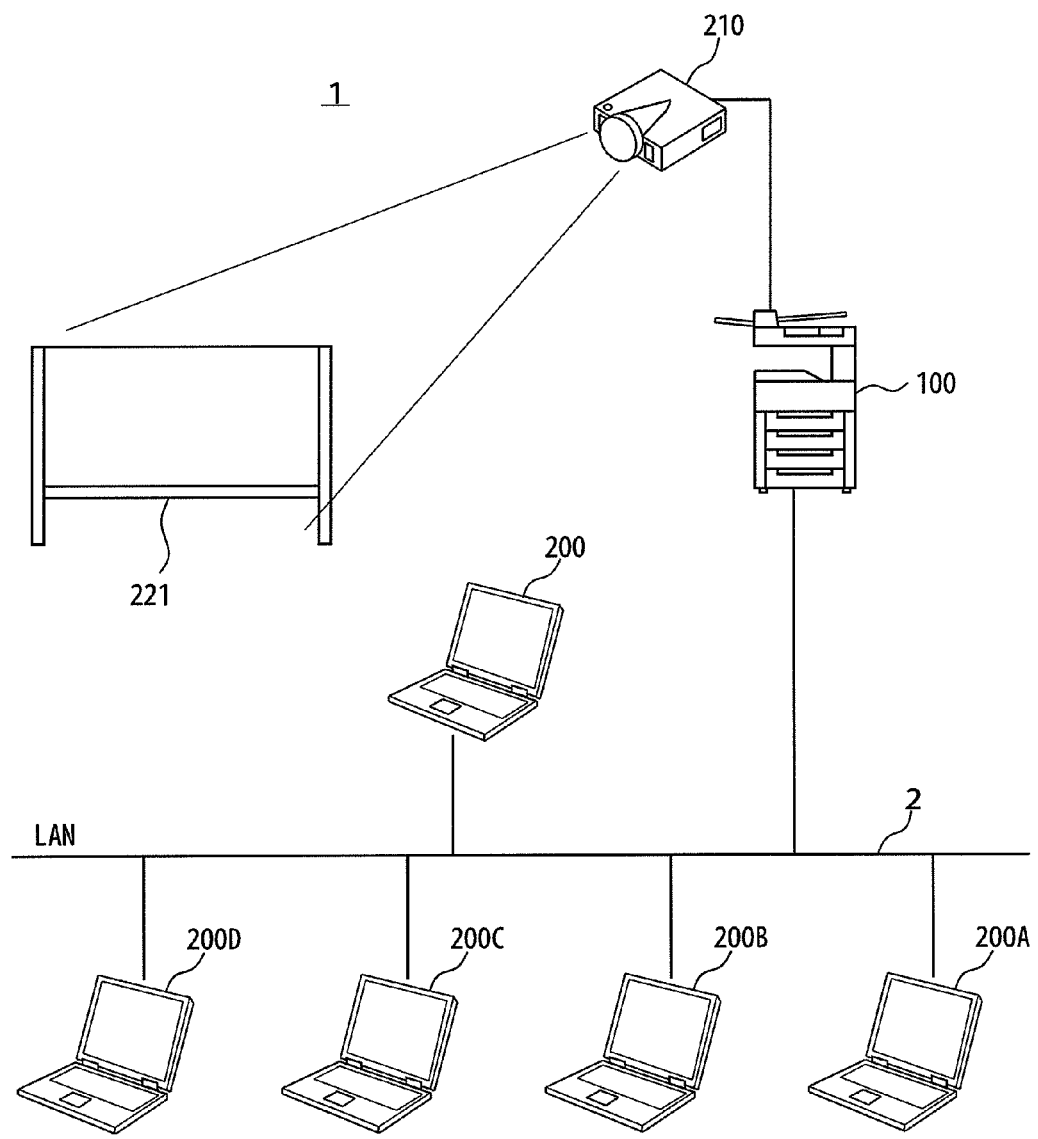
FIG. 1 is a diagram showing an exemplary meeting system in an embodiment of the present invention.

In the following, embodiments of the present invention will be described with reference to the figures. In the following description, the same parts are denoted with the same reference numerals. Their names and functions are also the same. Therefore, a detailed description thereof will not be repeated.

FIG. 1 shows an exemplary meeting system in an embodiment of the present invention. Referring to FIG. 1, a meeting system 1 includes an MFP (Multi Function Peripheral) 100, and PC 200, 200A-200D, a projector 210, and a whiteboard 221. MFP 100 and PC 200, 200A-200D are connected to a Local Area Network (referred to as "LAN" hereinafter) 2.

MFP 100 is an exemplary information processing apparatus and includes multiple functions such as a scanner function, a printer function, and a copy function. MFP 100 can communicate with PC 200, 200A-200D via LAN 2. MFP 100 is connected with projector 210 to control projector 210 such that the projector projects images. Although MFP 100 and PC 200, 200A-200D are connected via LAN 2 by way of example, they may be connected through a serial communication cable or a parallel communication cable as long as they can communicate with each other. The connection may be either wired or wireless. Although here projector 210 is directly connected to MFP 100, projector 210 may be connected to LAN 2 so that MFP 100 controls projector 210 via LAN 2.

In meeting system 1 in the present embodiment, a presenter of a meeting stores content, which is a presentation material, into MFP 100. The content may be any data that can be displayed on a computer, for example, images, characters, graphs, or a combination data thereof.

MFP 100 functions as a display control apparatus which controls projector 210 such that projector 210 projects at least a partial image of content so that the image appears on whiteboard 221. Specifically, MFP 100 sets at least part of content as a display part and sends an image of the display part as a display image to projector 210 so that projector 210 displays the display image. The display image has the same size as an image that can be displayed by the projector. Therefore, if the content as a whole is larger than the size of the display image, part of the content is set as a display part. If the content as a whole is equal to or smaller than the size of the display image, the entire content is set as a display part.

It is noted that MFP 100 may send content to projector 210 so that MFP 100 remotely operates projector 210 to allow the projector to display a display image. In this case, at least part of content is also set as a display part, and a display image of the display part of content is displayed. The display image sent from MFP 100 to projector 210 is in any format as long as it can be received and interpreted by projector 210.

Projector 210 includes a liquid crystal display, a lens, and a light source to project a display image received from MFP 100 on a drawing plane of whiteboard 221. The liquid crystal display displays the display image. Light emitted from the light source passes through the liquid crystal display onto whiteboard 221 through the lens. When light from projector 210 is applied to the drawing plane of whiteboard 221, an enlarged image of the display image appearing on the liquid crystal display is projected on the drawing plane. Here, the drawing plane of whiteboard 221 is a projection plane on which projector 210 projects a display image.

PC 200, 200A-200D are general computers and have a well-known hardware configuration and function. Therefore, a description thereof is not repeated here. PC 200, 200A-200D can access a hard disk drive (HDD) of MFP 100 to download or receive streamed distribution of content stored in the HDD and display images of the downloaded content or the streamed moving image.

Figure 2:
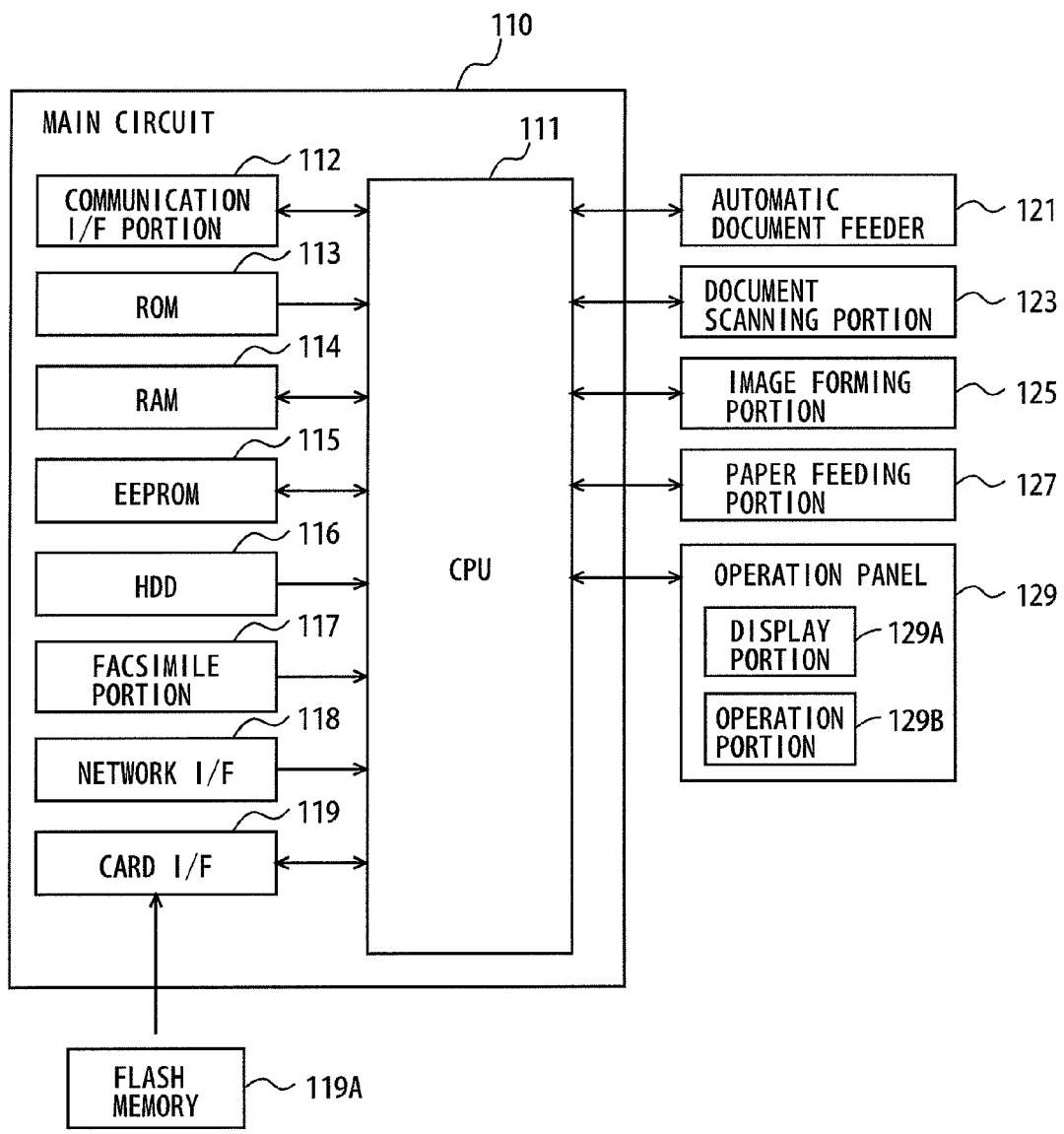
FIG. 2 is a block diagram showing an exemplary hardware configuration of an MFP.

FIG. 2 is a block diagram showing an exemplary hardware configuration of MFP. Referring to FIG. 2, MFP 100 includes a main circuit 110, a document scanning portion 123 for scanning a document, an automatic document feeder 121 for feeding a document to document scanning portion 123, an image forming portion 125 for forming, for example, on paper, a still image output by document scanning portion 123 scanning a document, a paper feeding portion 127 for supplying paper to image forming portion 125, and an operation panel 129 serving as a user interface.

Main circuit 110 includes a CPU 111, a communication interface (I/F) portion 112, a ROM (Read Only Memory) 113, a RAM (Random Access Memory) 114, an EEPROM (Electronically Erasable and Programmable ROM) 115, a hard disk drive (HDD) 116 as a mass storage device, a facsimile portion 117, a network I/F 118, and a card interface (I/F) 119 to which a flash memory 119A is attached. CPU 111 is connected with automatic document feeder 121, document scanning portion 123, image forming portion 125, paper feeding portion 127, and operation panel 129 to control the entire MFP 100.

ROM 113 stores a program executed by CPU 111 and data required to execute the program. RAM 114 is used as a work area for CPU 111 to execute a program.

Operation panel 129 is provided on a top surface of MFP 100 and includes a display portion 129A and an operation portion 129B. Display portion 129A is a display such as a liquid crystal display or an organic ELD (Electroluminescence Display) to display an instruction menu for users, information about the obtained display data, and the like. Operation portion 129B includes a plurality of keys to accept a variety of instructions and data input such as characters and numerals through the user's operations corresponding to the keys. Operation portion 129B further includes a touch panel provided on display portion 129A.

Communication I/F portion 112 is an interface for connecting MFP 100 to any other device, here, projector 210. A serial communication cable, a parallel communication cable, or a video cable may be connected to the interface. The connection may be either wired or wireless.

Facsimile portion 117 is connected with Publish Switched Telephone Network (PSTN) to send facsimile data to PSTN or receive facsimile data from PSTN. Facsimile portion 117 stores the received facsimile data in HDD 116 or outputs the same to image forming portion 125. Image forming portion 125 prints the facsimile data received by facsimile portion 117 on paper. Facsimile portion 117 also converts the data stored in HDD 116 into facsimile data and sends the facsimile data to a facsimile machine connected to PSTN.

HDD 116 includes a plurality of storage areas for storing data in a nonvolatile manner. The plurality of storage areas, allocated to a user who is allowed to use MFP 100, include a personal storage area 181 that can be accessed by the above-noted user and a public storage area 183 that can be accessed by a plurality of users.

Network I/F 118 is an interface for connecting MFP 100 to LAN 2. CPU 111 can communicate with PC 200, 200A-200D and projector 210 connected to LAN 2 through network I/F 118. If LAN 2 is connected to the Internet, CPU 111 can also communicate with a computer connected to the Internet. The computer connected to the Internet includes an email server for sending/receiving emails. Network I/F 118 may connect not only to LAN 2 but also to the Internet, a Wide Area Network (WAN), a Public Switched Telephone Network, etc.

Flash memory 119A is attached to card I/F 119. CPU 111 can access flash memory 119A through card I/F 119 and can load a program stored in flash memory 119A into RAM 114 for execution. The program executed by CPU 111 may not be the program stored in flash memory 119A but may be a program stored in any other storage medium, a program stored in HDD 116, or a program written in HDD 116 by any other computer connected to LAN 2 through network I/F 118.

It is noted that a recording medium for storing a program is not limited to flash memory 119A and may be an optical disk (MO (Magnetic Optical Disc)/MD (Mini Disc)/DVD (Digital Versatile Disc)), an IC card, an optical card, or a semiconductor memory such as a mask ROM, EPROM (Erasable Programmable ROM), or EEPROM (Electrically Erasable and Programmable ROM).

The program referred to herein includes not only a program directly executable by CPU 111 but also a source program, a compressed program, an encrypted program, and the like.

Figure 3:
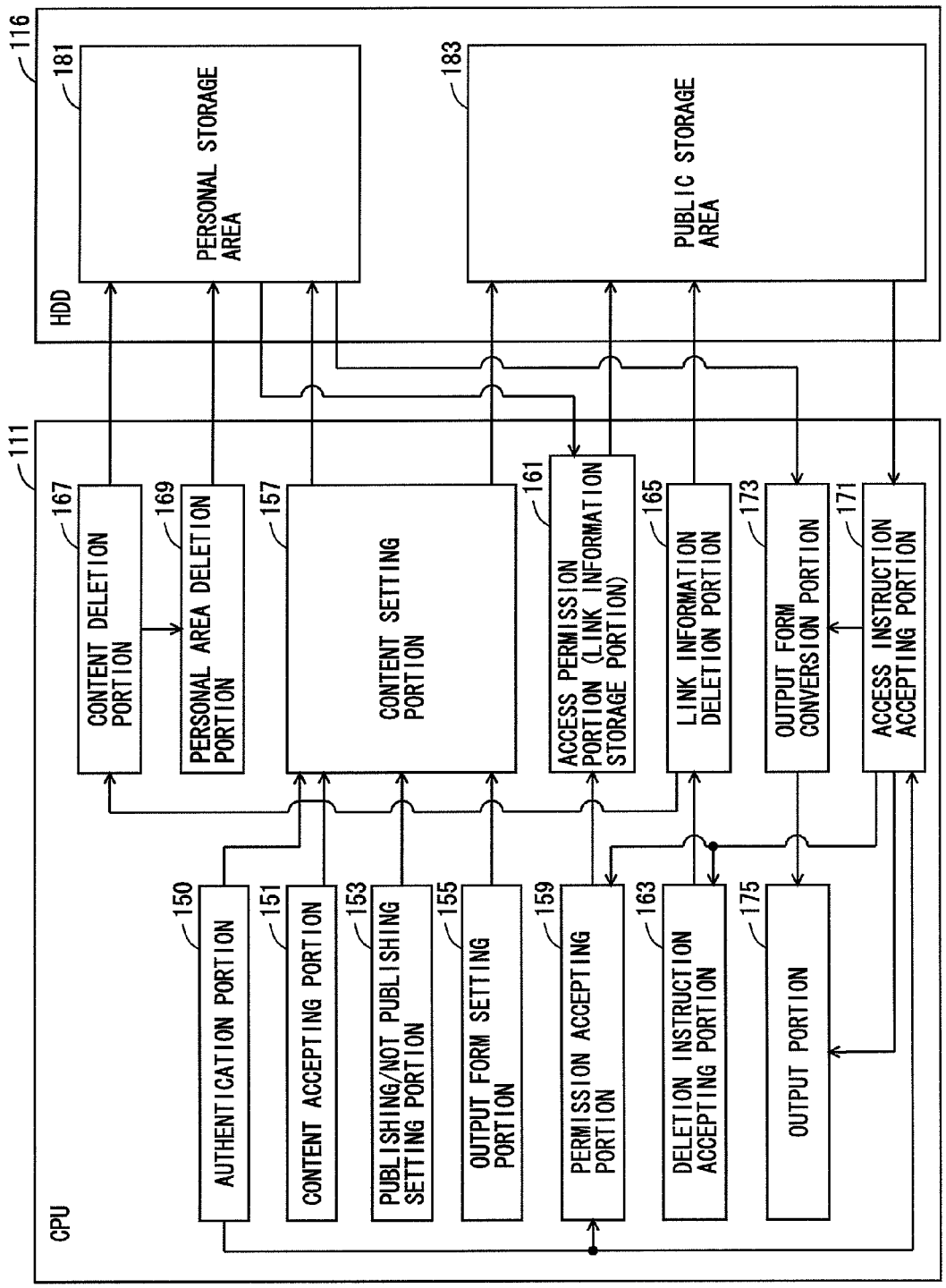
FIG. 3 is a block diagram showing an example of functions configured in CPU included in the MFP.

FIG. 3 is a block diagram showing an example of functions configured in CPU of the MFP. The functions shown in FIG. 3 are implemented by CPU 111 of MFP 100 executing a content management program stored in ROM 113 or flash memory 119A. Referring to FIG. 3, the functions implemented by CPU 111 include an authentication portion 150 for authenticating a user who operates MFP 100, a content accepting portion 151 for accepting content from the outside, a publishing/not publishing setting portion 153 for setting whether to publish or not, an output form setting portion 155 for setting an output form, a content setting portion 157 for storing the accepted content in HDD 116, a permission accepting portion 159 for accepting permission to publish content set private, an access permission portion 161 for permitting access to content, a deletion instruction accepting portion 163, a link information deletion portion 165, a content deletion portion 167 for deleting content stored in HDD 116, a personal area deletion portion 169, an access instruction accepting portion 171 for accepting an access instruction, an output form conversion portion 173 for converting content into the output form set for the content, and an output portion 175 outputting converted content having the converted output form.

Authentication portion 150 authenticates the user who operates MFP 100. A pair of a user ID and a password input by the user is compared with a pair of user ID and password stored beforehand, and if there is a match, the user is authenticated. If there is no match, the user is not authenticated. If the user is authenticated, authentication portion 150 outputs the user ID to content setting portion 157, deletion instruction accepting portion 163, and access instruction accepting portion 171.

Content accepting portion 151 accepts content from the outside and outputs the accepted content to content setting portion 157.

Publishing/not publishing setting portion 153 accepts whether to publish or not the content accepted by content accepting portion 151 and outputs the accepted setting to content setting portion 157. The setting of whether to publish or not indicates either "public" indicating to publish or "private" indicating not to publish.

Output form setting portion 155 sets an output form of publishing the content that is accepted by content accepting portion 151 and is set "private" by publishing/not publishing setting portion 153, and outputs the set output form to content setting portion 157. The output form includes access restriction on content and a data format. The access restriction is restriction of printing and/or restriction of copying. The data format is a moving image data format or a still image data format.

The user operates MFP 100 in two ways: the user operates one of PC 200, 200A-200F to remotely operate MFP 100; or the user directly operates MFP 100 by manipulating operation portion 129B. First, the remote operation of MFP 100 will be described, where the user operates PC 200 by way of example. When the user operates PC 200 to allow PC 200 to transmit a login request to MFP 100, PC 200 transmits a login request to MFP 100. Upon receiving the login request, MFP 100 sends back a login screen to PC 200. The login screen includes a region for inputting a user ID and a password. Upon receiving the login screen, PC 200 displays the login screen on the display. If the user inputs the user ID and the password in the login screen, they are transmitted to MFP 100.

When network I/F 118 of MFP 100 receives the user ID and the password from PC 200, authentication portion 150 accepts them and authenticates the user who operates PC 200. Authentication portion 150 compares a pair of the accepted user ID and password with a pair of user ID and password stored beforehand, and if there is a match, authenticates the user who operates PC 200. If there is no match, the user is not authenticated. If the user is authenticated, authentication portion 150 outputs the user ID to content setting portion 157, permission accepting portion 159, and access instruction accepting portion 171.

If the user is authenticated in authentication portion 150, content setting portion 157 transmits a content accepting screen to PC 200. The content accepting screen includes a region for designating content, a region for setting whether to publish or not, and a region for setting an output form. Upon receiving the content accepting screen, PC 200 displays the content accepting screen on the display. In accordance with the content accepting screen, the user sets a file name of content in the region for designating content, sets either "public" or "private" in the region for setting whether to publish or not, and if "private" is set, inputs an output form in the region for setting an output form. The file name, the setting of whether to publish or not, and the output form are then output to MFP 100.

At MFP 100, network I/F 118 receives the file name of content, the setting of whether to publish or not, and the output form, if any, from PC 200. Content accepting portion 151 obtains the file name of content received by network I/F 118 and retrieves the content specified by the file name. If the content is stored in the hard disk of PC 200, the content is retrieved from PC 200. If the content is stored in any other computer, the content is retrieved from that computer. If the content is stored in HDD 116 of MFP 100, the content is read from HDD 116. The retrieved content is output to content setting portion 157. Publishing/not publishing setting portion 153 obtains the setting of whether to publish or not received by network I/F 118, and outputs the obtained setting to content setting portion 157. Output form setting portion 155 obtains the output form received by network I/F 118 and outputs the obtained output form to content setting portion 157.

Next, the direct operation of MFP 100 through the user's manipulation of operation portion 129B will be described. MFP 100 displays a login screen on display portion 129A. Similar to the login screen in the remote operation of MFP 100, the login screen includes a region for inputting a user ID and a password. When the user inputs the user ID and the password to operation portion 129B in accordance with the login screen, authentication portion 150 accepts the user ID and the password. Then, if authentication portion 150 authenticates the user, content setting portion 157 displays a content accepting screen on display portion 129A. The content accepting screen includes a region for designating content, a scan button for inputting a scan instruction, a region for setting whether to publish or not, and a region for setting an output form. This content accepting screen differs from that in the remote operation of MFP 100 in that it includes the scan button.

If the user sets the file name of content in the region for designating content in accordance with the content accepting screen, content accepting portion 151 accepts the file name. If the user designates the scan button, content accepting portion 151 accepts the scan instruction. If the user sets either "public" or "private" in the region for setting whether to publish or not, publishing/not publishing setting portion 153 obtains the setting of whether to publish or not. If "private" is set, if the user inputs an output form in the region for setting an output form, output form setting portion 155 obtains the output form.

At MFP 100, content accepting portion 151 accepts the file name of content input to operation portion 129B and then retrieves the content specified by the file name. If the content is stored in the hard disk of PC 200, the content is retrieved from PC 200. If it is stored in any other computer, the content is retrieved from that computer. If the content is stored in HDD 116 of MFP 100, the content is read from HDD 116. The retrieved content is then output to content setting portion 157. When a scan instruction is input to operation portion 129B, content accepting portion 151 accepts the scan instruction and controls document scanning portion 130 such that document scanning portion 130 scans an image of a document. Content accepting portion 151 then obtains, as content, image data output by document scanning portion 130 scanning the document and outputs the obtained content to content setting portion 157.

Publishing/not publishing setting portion 153 obtains the setting of whether to publish or not input to operation portion 129B and outputs the obtained setting to content setting portion 157. Output form setting portion 155 obtains the output form input to operation portion 129B and outputs the obtained output form to content setting portion 157.

Content setting portion 157 receives a user ID from authentication portion 150, receives content from content accepting portion 151, and receives the setting of whether to publish or not from publishing/not publishing setting portion 153. If the setting "private" is input from publishing/not publishing setting portion 153, content setting portion 157 may also receive an output form from output form setting portion 155.

Content setting portion 157 stores the content set "public" by the authenticated user into public storage area 183 among a plurality of storage areas of HDD 116. For example, if the user identified by the user ID input from authentication portion 150 is a user A, if the setting "public" is input from publishing/not publishing setting portion 153, the content input from content accepting portion 151 is stored into public storage area 183 among a plurality of storage areas of HDD 116. The content stored in public storage area 183 of HDD 116 can be accessed by user A and all the users other than user A.

If the setting "private" is input from publishing/not publishing setting portion 153, if personal storage area 181 of the authenticated user is not allocated in HDD 116, content setting portion 157 creates a new personal storage area 181 allocated to the authenticated user. Content setting portion 157 stores the content set private by the authenticated user into personal storage area 181 allocated to the authenticated user among a plurality of storage areas of HDD 116. For example, if a user identified by the user ID input from authentication portion 150 is a user A, if the setting "private" is input from publishing/not publishing setting portion 153, the content input from content accepting portion 151 is stored into personal storage area 181 allocated to user A among a plurality of storage areas of HDD 116.

If an output form is input from output form setting portion 155, content setting portion 157 stores the content set private into personal storage area 181 in association with the output form.

Permission accepting portion 159 accepts permission to publish the content set private by the authenticated user. When accepting the user's operation of accessing content stored in personal storage area 181, permission accepting portion 159 accepts permission to publish the content. The content set private by the authenticated user is stored, by content setting portion 157, in personal storage area 181 accessible only by that user. Therefore, permission to publish content is only given by the authenticated user and is accepted when the content set private is accessed. Access to content is accepted by access instruction accepting portion 171, which will be described later in detail. The access to content includes a process of MFP 100 outputting content to projector 210. When accepting permission to publish content, permission accepting portion 159 outputs access permission to access permission portion 161. The access permission includes content identification information for identifying content.

Permission accepting portion 159 also accepts permission to publish content when the authenticated user inputs an instruction to permit publishing. The instruction to permit publishing is accepted after the content stored in personal storage area 181 allocated to the authenticated user is selected.

When accepting access permission from permission accepting portion 159, access permission portion 161 creates link information for accessing the content specified by the content identification information included in the access permission and stores the created link information into public storage area 183 of HDD 116. The link information includes the content identification information of the content stored in personal storage area 181. Since public storage area 183 can be accessed by a plurality of users, any user who is authenticated by authentication portion 150 can access the link information.

Access instruction accepting portion 171 receives a user ID from authentication portion 150 and enables access to public storage area 183 and personal storage area 181 allocated to the user identified by the user ID input from authentication portion 150, of a plurality of storage areas of HDD 116. In other words, access instruction accepting portion 171 does not enable access to personal storage area 181 that is not allocated to the user identified by the user ID input from authentication portion 150, of a plurality of storage areas of HDD 116.

If accepting an access instruction to personal storage area 181, access instruction accepting portion 171 outputs the content identification information of the content stored in personal storage area 181, and if the output content identification information is designated, outputs the content identified by the designated content identification information to output portion 175. Specifically, when the user remotely operates MFP 100 using one of PC 200, 200A-200D, for example, when the user uses PC 200, access instruction accepting portion 171 transmits the content identification information stored in personal storage area 181 allocated to the user identified by the user ID input from authentication portion 150, to PC 200 through network I/F 118. If a plurality of contents are stored in personal storage area 181, the content identification information of all of the plurality of contents is transmitted.

At PC 200, the content identification information is displayed in a selectable manner. If the user selects one of the content identification information displayed in a selectable manner, PC 200 transmits an output instruction including the selected content identification information to MFP 100. When network I/F 118 receives the output instruction, access instruction accepting portion 171 reads out from personal storage area 181 the content identified by the content identification information included in the received output instruction and outputs the read content and the device identification information of PC 200 to output portion 175. The device identification information is, for example, an address in network 2 that is allocated to PC 200 and is here an IP (Internet Protocol) address. When receiving an output stop instruction from PC 200, access instruction accepting portion 171 outputs an output stop signal including the content identification information to output portion 175 and deletion instruction accepting portion 163.

When the user operates MFP 100 using operation portion 129B, access instruction accepting portion 171 displays on display portion 129A the content identification information stored in personal storage area 181 allocated to the user identified by the user ID input from authentication portion 150. If a plurality of contents are stored in personal storage area 181, the content identification information of all of the plurality of contents is displayed in a selectable manner on display portion 129A. When the user inputs to operation portion 129B an operation of selecting one of the content identification information displayed in a selectable manner on display portion 129A, access instruction accepting portion 171 reads out the content identified by the selected content identification information from personal storage area 181 and outputs the read content to output portion 175. When the user inputs an output stop instruction to operation portion 129B, access instruction accepting portion 171 outputs an output stop signal including the content identification information to output portion 175 and deletion instruction accepting portion 163.

When content is input from access instruction accepting portion 171, output portion 175 outputs the content in the form designated by the authenticated user. For example, if the authenticated user designates displaying, output portion 175 displays the content on display portion 129A. If the authenticated user designates printing, image forming portion 125 forms an image of the content. If the authenticated user designates output to projector 210, an image of the content is output to projector 210 through communication I/F 112 so that projector 210 displays the image of the content. When content and device identification information are input from access instruction accepting portion 171, output portion 175 sends the content to the device specified by the device identification information through network I/F 112. Here, content input from access instruction accepting portion 171 is sent to PC 200 specified by the device identification information through network I/F portion 112. At PC 200 receiving content, content may be displayed on the display, stored in HDD of PC 200, or printed by a printer or MFP 100 connected to PC 200.

When an access instruction to public storage area 183 is accepted, access instruction accepting portion 171 outputs the content identification information of the content stored in public storage area 183, and if the output content identification information is designated, outputs the content identified by the designated content identification information. The content is output similarly to the case when an access instruction to personal storage area 181 is accepted. Therefore, the description is not repeated here.

If link information is stored in public storage area 183, access instruction accepting portion 171 accepts an access instruction to public storage area 183 and then outputs the link information together with the content identification information of the content stored in public storage area 183. If a plurality of link information is stored in public storage area 183, the plurality of link information is output. When the user remotely operates MFP 100 using one of PC 200, 200A-200D, for example, when the user uses PC 200, access instruction accepting portion 171 sends the link information together with the content identification information of the contents stored in public storage area 183, to PC 200 through network I/F 118. At PC 200, the link information is displayed in a selectable manner. When the user selects one of the link information displayed in a selectable manner, PC 200 sends a transmission instruction including the selected link information to MFP 100. Access instruction accepting portion 171 accepts the transmission request received from PC 200 by network I/F 118.

On the other hand, when the user operates MFP 100 using operation portion 129B, access instruction accepting portion 171 displays on display portion 129A the link information in a selectable manner, together with the content identification information of the content stored in public storage area 183. When the user selects one of the link information displayed in a selectable manner, access instruction accepting portion 171 accepts the selected link information. Furthermore, when the output link information is designated, if the content associated with the designated link information is stored in personal storage area 181 allocated to the authenticated user, access instruction accepting portion 171 outputs the content identification information of that content to output portion 175. If the content is stored in personal storage area 181 allocated to another user, access instruction accepting portion 171 outputs the content identification information to output form conversion portion 173.

Specifically, when the user remotely operates MFP 100 using one of PC 200, 200A-200D, for example, when the user uses PC 200, access instruction accepting portion 171 accepts a transmission instruction sent from PC 200, and if the content specified by the link information included in the accepted transmission instruction is stored in personal storage area 181 allocated to the authenticated user, outputs the content identification information and the device information of PC 200 to output portion 175. If the content specified by the link information included in the accepted transmission instruction is stored in personal storage area 181 allocated to a user different from the authenticated user, access instruction accepting portion 171 outputs the content identification information and the device identification information of PC 200 to output form conversion portion 173. On the other hand, if the content specified by the link information included in the accepted transmission instruction is stored in personal storage area 181 allocated to the authenticated user, when receiving an output stop instruction from PC 200, access instruction accepting portion 171 outputs an output stop signal including the content identification information to output portion 175 and deletion instruction accepting portion 163.

On the other hand, when the user operates MFP 100 using operation portion 129B, if the content specified by the link information accepted from operation portion 129B is stored in personal storage area 181 allocated to the authenticated user, access instruction accepting portion 171 outputs the content identification information of the content to output portion 175. If the content specified by the accepted link information is stored in personal storage area 181 allocated to a user different from the authenticated user, access instruction accepting portion 171 outputs the content identification information of the content to output form conversion portion 173. If the content specified by the link information included in the accepted transmission request is stored in personal storage area 181 allocated to the authenticated user, when the user inputs an output stop instruction to operation portion 129B, an output stop signal including the content identification information is output to output portion 175 and deletion instruction accepting portion 163.

When the content identification information is input from access instruction accepting portion 171, if the content specified by the content identification information is associated with an output form, output form conversion portion 173 reads the content and outputs the converted content having the converted output form associated therewith to output portion 175. If the output form associated with the content is access restriction on content, the converted content with access restriction is output to output portion 175.

Specifically, if the access restriction is print protection, the converted content with control information of print protection is output. If the access restriction is print protection, the converted content with control information of copy protection is output. On the other hand, if the output form associated with the content is a data format, the converted content produced by converting the content in that data format is output to output portion 175. For example, if the content is in a still image data format and the output form is a moving image data format, the content is converted into the converted content in a moving image data format by creating moving images from the content in a still image data format, and the converted content is then output to output portion 175. When the device identification information is input together with the content identification information from access instruction accepting portion 171, output form conversion portion 173 outputs the device identification information together with the content to output portion 175.

When content is input from access instruction accepting portion 171, output portion 175 outputs the content in the form designated by the authenticated user. For example, when the user uses operation portion 129B or remotely operates MFP 100 using PC 200, if the authenticated user designates displaying, output portion 175 displays the content on display portion 129A. If the authenticated user designates printing, output portion 175 allows image forming portion 125 to form an image of the content. If the authenticated user designates output to projector 210, output portion 175 outputs an image of the content to projector 210 through communication I/F 112 and allows projector 210 to display the image of the content. Furthermore, when the user remotely operates MFP 100 using PC 200, output portion 175 can send the content through network I/F 112 specified by the device identification information. At PC 200 receiving the content, the content may be displayed on the display, stored in HDD of PC 200, or printed by a printer or MFP 100 connected to PC 200.

On the other hand, when output portion 175 receives the converted content from output form conversion portion 173, access restriction may be imposed on the converted content input from output form conversion portion 173 in some cases. Output portion 175 outputs the converted content in the form designated by the authenticated user, and when the access restriction is imposed on the converted content, output portion 175 outputs the converted content in accordance with the access restriction. Furthermore, the converted content input from output form conversion portion 173 may have a converted format in some cases. In this case, the converted content in the converted format is output.

For example, when the user uses operation portion 129B or remotely operates MFP 100 using PC 200, output portion 175 displays the converted content on display portion 129A, if the authenticated user designates displaying. If the content is in a moving image format, a moving image is displayed. If the authenticated user designates printing, output portion 175 allows image forming portion 125 to form an image of the converted content on condition that access restriction of print protection is not imposed on the converted content. If the authenticated user designates output to projector 210, output portion 175 outputs an image of the converted content to projector 210 through communication I/F 112 and allows projector 210 to display the image of the converted content. If the content is converted in a moving image format, a moving image is displayed.

When the user remotely operates MFP 100 using PC 200, the converted content may be sent through network I/F portion 112 specified by the device identification information. Here, if access restriction is imposed on the converted content, the converted content is output in accordance with the access restriction at PC 200 that receives the converted content. Thus, if the access restriction imposed on the converted content is print protection, printing of the converted content is prohibited in PC 200, and if the access restriction is copy protection, the storage of the converted content into, for example, HDD is prohibited.

When receiving an output stop signal from access instruction accepting portion 171, deletion instruction accepting portion 163 specifies the link information of the content specified by the content identification information included in the input output stop signal and outputs a deletion instruction including the specified link information to link information deletion portion 165. On the other hand, when receiving an instruction to selectively delete link information stored in public storage area 183 from PC 200 used by the user to remotely operate MFP 100 or from operation portion 129B, deletion instruction accepting portion 163 outputs a deletion instruction including link information to link information deletion portion 165.

In response to input of the deletion instruction, link information deletion portion 165 deletes the link information included in the deletion instruction from public storage area 183 and also outputs to content deletion portion 167 a content deletion instruction including the content identification information of the content associated with the deleted link information.

Content deletion portion 167 receives the content deletion instruction and then deletes the content specified by the content identification information included in the content deletion instruction from personal storage area 181 and also outputs to personal area deletion portion 169 personal area identification information for identifying personal storage area 181 in which the deleted content has been stored.

Personal area deletion portion 169 receives the personal area identification information and, if content is not stored in personal storage area 181 specified by the personal area identification information, then deletes personal storage area 181 from HDD 116. However, if one or more contents are stored, personal storage area 181 is not deleted.

Figure 4:
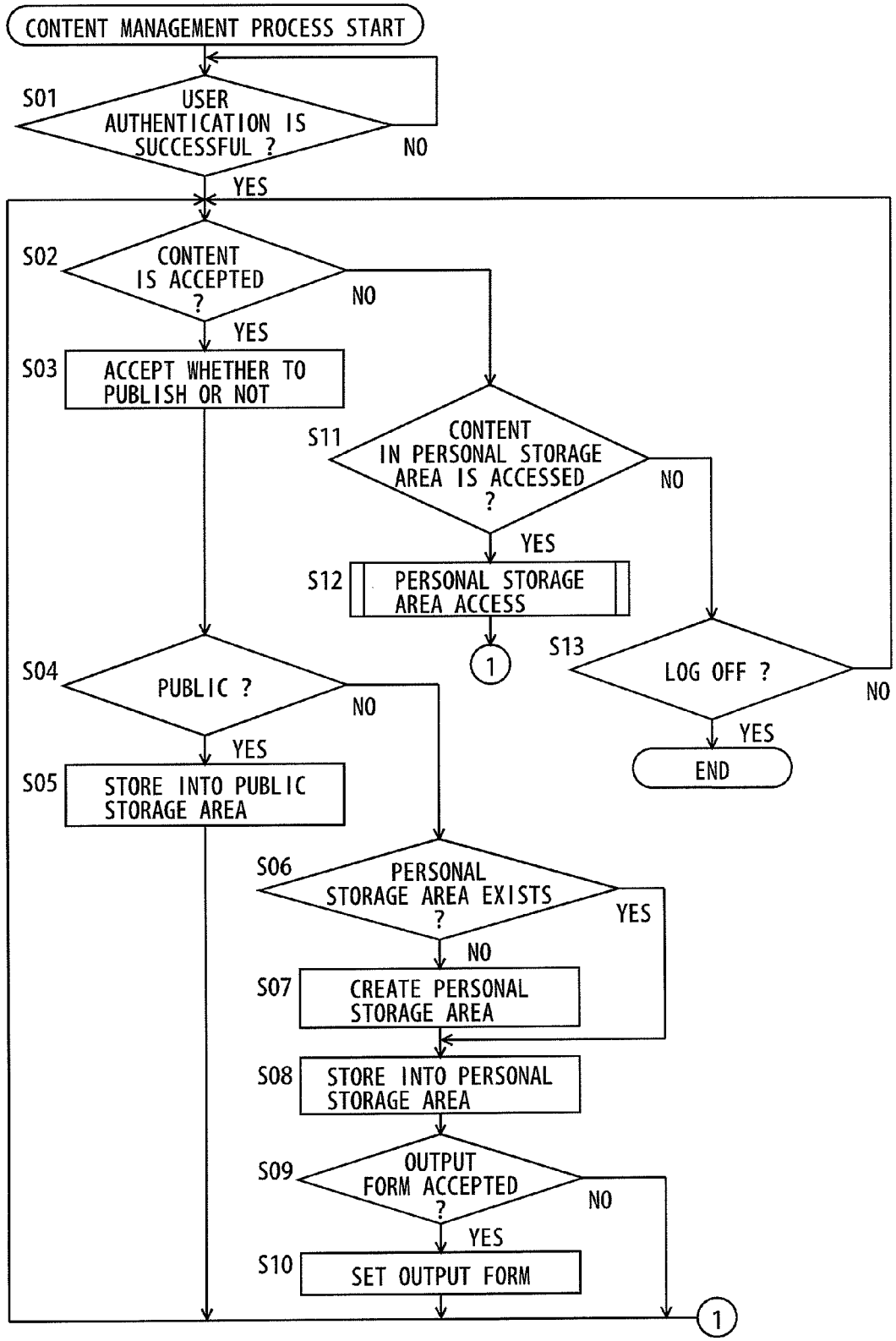
FIG. 4 is a flowchart showing an exemplary flow of a content management process.

FIG. 4 is a flowchart showing an exemplary flow of a content management process. The content management process is executed by CPU 111 of MFP 100 executing a content management program stored in ROM 113 or flash memory 119A.

Referring to FIG. 4, CPU 111 determines whether user authentication is successful (step S01). The process waits until user authentication is successful (NO in step S01). If user authentication is successful, the process proceeds to step S02. In other words, in the content management process, the process following step S02 is executed on condition that user authentication is successful.

In step S02, it is determined whether content is accepted. If content is accepted, the process proceeds to step S03. If not, the process proceeds to step S11. In step S03, the setting of whether to publish or not is accepted. In the next step S04, it is determined whether the setting accepted in step S03 indicates "public." If the setting indicating "public" is accepted, the process proceeds to step S05. If the setting indicating "private" is accepted, the process proceeds to step S06. In step S05, the content accepted in step S02 is stored in public storage area 183 of HDD 116, and the process then returns to step S02.

In step S06, it is determined whether the personal storage area allocated to the user authenticated in step S01 is included in HDD 116. If the personal storage area allocated to the authenticated user does not exist in HDD 116, the process proceeds to step S07. If the personal storage area exists, the process skips step S07 and proceeds to step S08. In step S07, a personal storage area allocated to the user authenticated in step S01 is created in HDD 116, and the process then proceeds to step S08.

In step S08, the content accepted in step S02 is stored in personal storage area 181 of HDD 116, and the process then proceeds to step S09. In step S09, it is determined whether an output form is accepted. If an output form is accepted, the process proceeds to step S10. If not, the process skips step S10 and returns to step S02. In step S10, the output form accepted in step S09 is set for the content stored in personal storage area 181 of HDD 116 in step S08. The process then returns to step S02.

In step S11, it is determined whether the content stored in personal storage area 181 of HDD 116 is accessed. If the content is accessed, the process proceeds to step S12. If not, the process proceeds to step S13. In step S12, a personal storage area access process is executed, and the process then returns to step S02. The personal storage area access process will be detailed later. On the other hand, in step S13, it is determined whether an instruction to log off is accepted. If an instruction to log off is accepted, the process ends. If not, the process returns to step S02.

Figure 5:
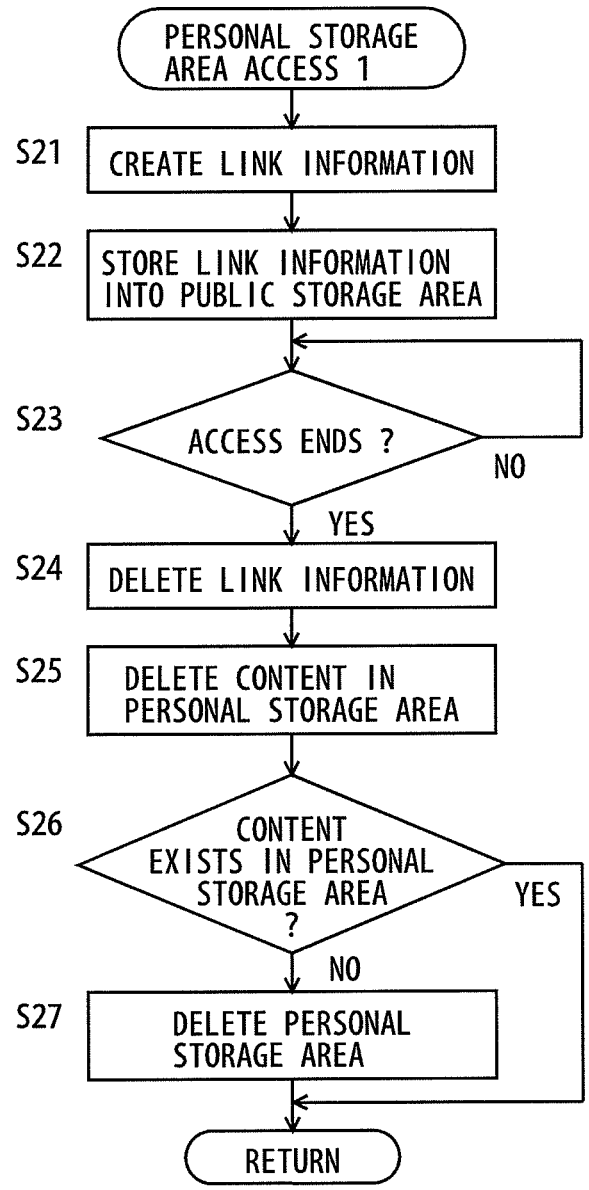
FIG. 5 is a flowchart showing an exemplary flow of a personal storage area access process.

FIG. 5 is a flowchart showing an exemplary flow of the personal storage area access process. The personal storage area access process is a process which is executed in step S12 of the content management process shown in FIG. 4 and which is executed if the content stored in personal storage area 181 is accessed. Referring to FIG. 5, CPU 111 creates link information for accessing the accessed content (step S21). The link information includes content identification information for identifying content. In the next step S22, the link information created in step S21 is stored in public storage area 183 of HDD 116.

In the next step S23, it is determined whether the access to the content ends. The process waits until the access to the content ends (NO in step S23). If the access ends, the process proceeds to step S24. In step S24, the link information stored in the public storage area in step S22 is deleted.

The link information for accessing content is stored in public storage area 183 while the authenticated user is accessing content stored in personal storage area 181 allocated to the user, so that other users can access the link information. When the authenticated user ends the access to the content stored in personal storage area 181, the link information stored in the public storage area is deleted. Therefore, after the authenticated user ends the access to the content, other users cannot access the content.

In the next step S25, the content associated with the link information deleted in step S24 is deleted from personal storage area 181. In the next step S26, it is determined whether content exists in the personal storage area from which the content has been deleted in step S25. If no content exists, the process proceeds to step S27. If even one content exists, the process skips step S27 and returns to the content management process. In step S27, the personal storage area is deleted from HDD 116, and the process then returns to the content management process.

Figure 6:
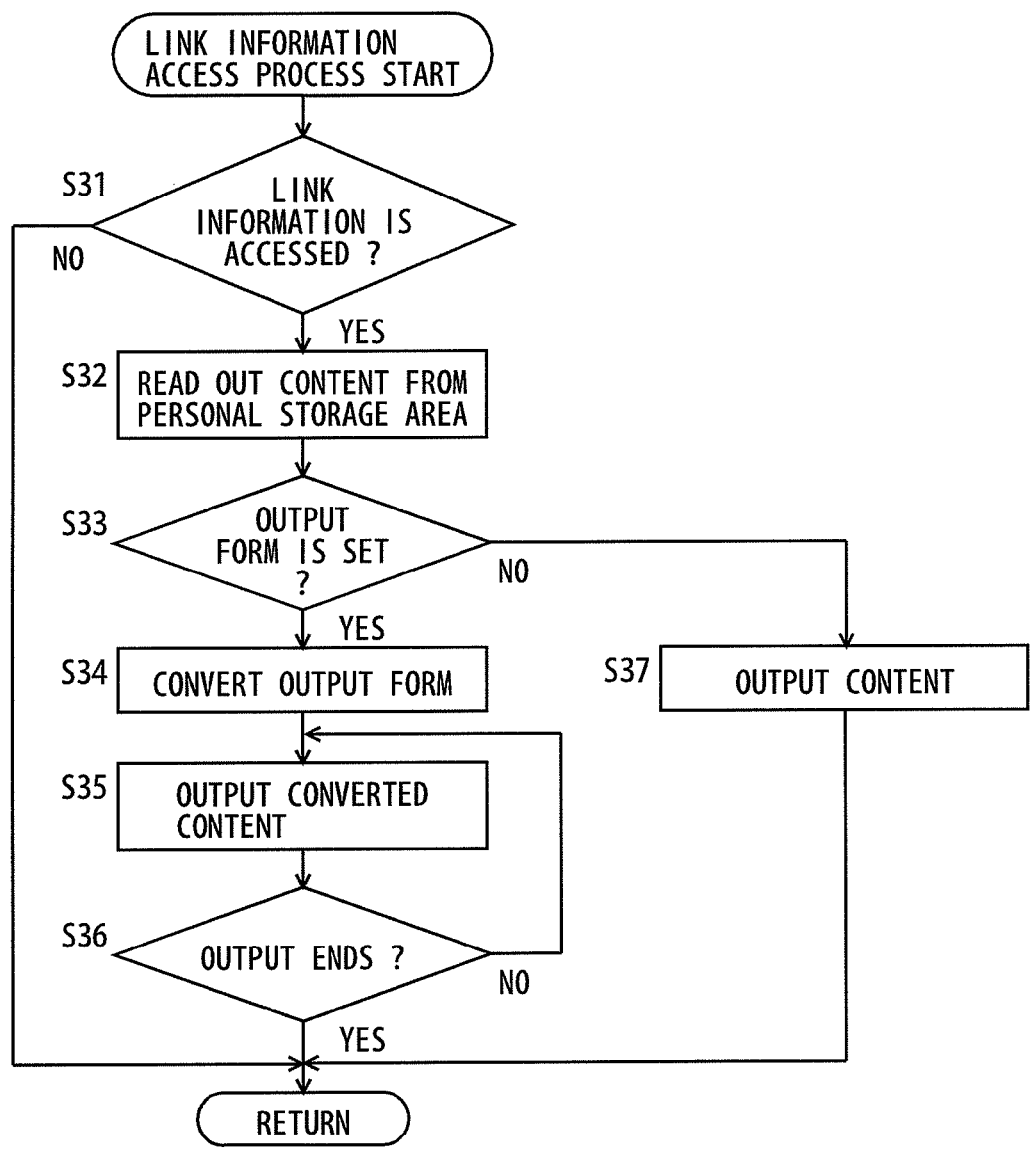
FIG. 6 is a flowchart showing an exemplary flow of a link information access process.

FIG. 6 is a flowchart showing an exemplary flow of a link information access process. The link information access process is a process executed by CPU 111 executing the content management program stored in ROM 113 or flash memory 119A. Referring to FIG. 6, CPU 111 determines whether link information is accessed (step S31). If link information is accessed, the process proceeds to step S32. If not, the process ends. In other words, the link information access process is a process executed when link information is accessed. Link information is accessed when the user is authenticated and the authenticated user accesses link information stored in public storage area 183 of HDD 116.

In step S32, content associated with the link information accessed in step S31 is read from personal storage area 181 in which the content is stored. In this case, personal storage area 181 in which the content associated with the accessed link information is stored may be or may not be allocated to the authenticated user.

In step S33, it is determined whether an output form is set for the content associated with the accessed link information. If an output form is set, the process proceeds to step S34. If not, the process proceeds to step S37. In step S34, the content associated with the accessed link information is converted into the content in the set output form. If access restriction is set as an output form, access restriction is imposed on the content. If a data format is set as an output form, the content is converted in the set data format.

In the next step S35, the converted content is output in the output form designated by the user who accesses the link information. For example, when the user uses operation portion 129B or remotely operates MFP 100 using PC 200, if the user designates displaying, output portion 175 displays the content on display portion 129A. If the content is in a moving image format, a moving image is displayed. If the user designates printing, output portion 175 allows image forming portion 125 to form an image of the content on condition that access restriction of print protection is not imposed on the content. If the user designates output to projector 210, output portion 175 outputs an image of the content to projector 210 through communication I/F 112 and allows projector 210 to display the image of the content. If the content is converted in a moving image format, a moving image is displayed.

Furthermore, when the user remotely operates MFP 100 using PC 200, content can be transmitted through network I/F portion 112 specified by device identification information. Here, if access restriction is imposed on the content, the content is output in accordance with the access restriction at PC 200 that receives the content. Thus, if the access restriction imposed on the content is print protection, printing of the content is prohibited in PC 200. If the access restriction is copy protection, storage of the content in HDD is prohibited. If the access restriction is write protection for content, modification of the content stored in HDD 116 is prohibited.

In step S36, it is determined whether the output of the content ends. If the output ends, the process ends. If not, the process returns to step S35.

On the other hand, in step S37, the content read out in step S32 is output in the output form designated by the user who accesses the link information, and the process then ends.

Figure 7:
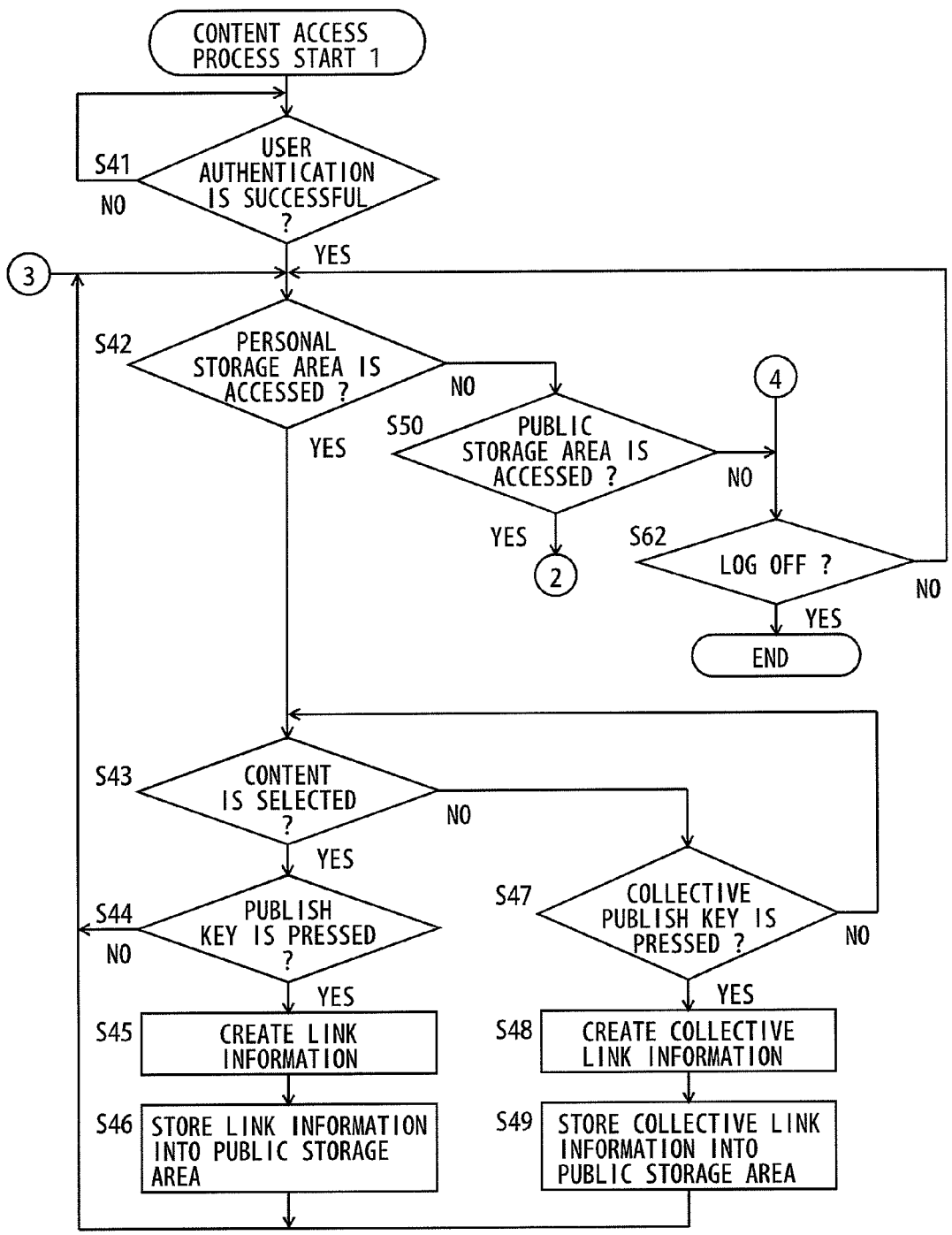
FIG. 7 is a first flowchart showing an exemplary flow of a content access process.
Figure 8:
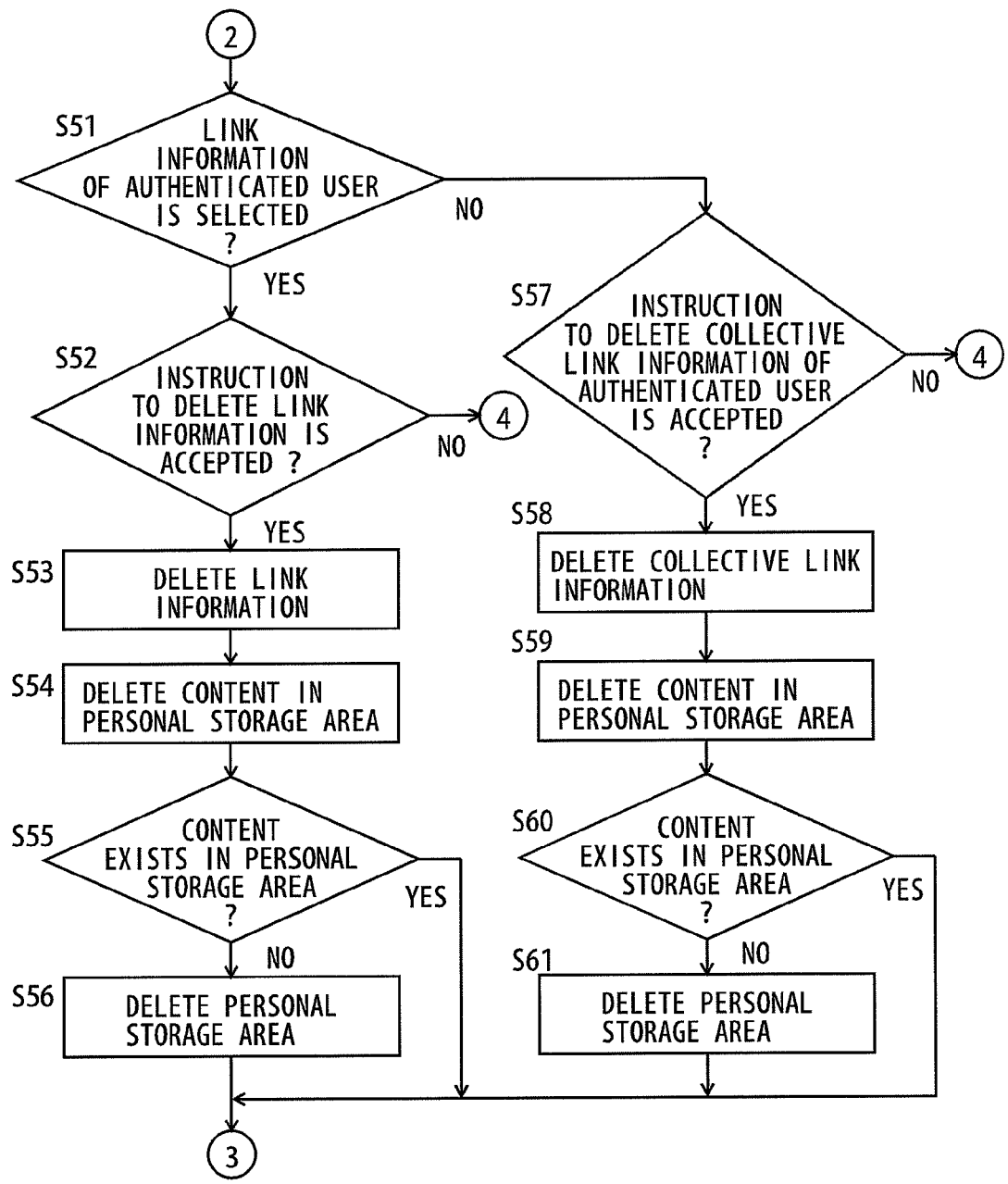
FIG. 8 is a second flowchart showing an exemplary flow of the content access process.

FIG. 7 and FIG. 8 are flowcharts showing an exemplary flow of the content access process. The content access process is a process executed by CPU 111 executing the content management program stored in ROM 113 or flash memory 119A. Referring to FIG. 7 and FIG. 8, CPU 111 determines whether user authentication is successful. The process waits until user authentication is successful (NO in step S41). If user authentication is successful, the process proceeds to step S42. In other words, in the content access process, the process following step S42 is executed on condition that user authentication is successful.

In the next step S42, it is determined whether the authenticated user accesses the personal storage area allocated to the user. If the user accesses the personal storage area, the process proceeds to step S43. If not, the process proceeds to step S50. In step S50, it is determined whether the authenticated user accesses public storage area 183 of HDD 116. If the user accesses public storage area 183, the process proceeds to step S51. If not, the process proceeds to step S62. In step S62, it is determined whether the authenticated user inputs a log-off operation. If the user inputs a log-off operation, the process ends. If not, the process returns to step S42.

In other words, the process in step S43 to step S49 is executed if the authenticated user accesses personal storage area 181, the process in step S51 to step S61 is executed if the user accesses public storage area 183, and the process ends if the user inputs a log-off operation.

In step S43, it is determined whether content stored in personal storage area 181 is selected. If selected, the process proceeds to step S44. If not, the process proceeds to step S47. In step S44, it is determined whether a publish key is pressed. If the publish key is pressed, the process proceeds to step S45. If not, the process returns to step S42. In step S45, link information is created. Link information including the content identification information of the content selected in step S43 for accessing that content is created. In the next step S46, the created link information is stored into public storage area 183 of HDD 116, and the process returns to step S42.

On the other hand, in step S47, it is determined whether a collective publish key is pressed. If the collective publish key is pressed, the process proceeds to step S48. If not, the process returns to step S43. In step S48, collective link information is created, and the process then proceeds to step S49. The collective link information is information including content identification information of all the plurality of contents stored in personal storage area 181 for accessing all the plurality of contents. In step S49, the created collective link information is stored in public storage area 183 of HDD 116, and the process returns to step S42.

In step S51, it is determined whether the link information of the user authenticated in step S41 is selected. The link information of the authenticated user is link information for accessing content stored in personal storage area 181 allocated to the authenticated user. If the link information of the authenticated user is selected, the process proceeds to step S52. If not, the process proceeds to step S57.

In step S52, it is determined whether an instruction to delete the selected link information is accepted. If an instruction to delete the link information is accepted, the process proceeds to step S53. If not, the process proceeds to step S62. It is noted that the link information access process shown in FIG. 6 may be executed here.

In step S53, the link information selected in step S51 is deleted from public storage area 183, and the process then proceeds to step S54. In the next step S54, the content associated with the link information deleted in step S53 is deleted from personal storage area 181. In the next step S55, it is determined whether content exists in the personal storage area in which the deleted content has been stored. If no content exists in the personal storage area, the process proceeds to step S56. If even one exists, the process returns to step S42. In step S56, personal storage area 181 is deleted from HDD 116, and the process then returns to step S42.

In step S57, it is determined whether an instruction to delete the collective link information of the user authenticated in step S41 is accepted. If an instruction to delete the link information is accepted, the process proceeds to step S58. If not, the process proceeds to step S62. It is noted that the link information access process shown in FIG. 6 may be executed here. The collective link information of the authenticated user is link information for accessing all the contents stored in personal storage area 181 allocated to the authenticated user.

In step S58, the collective link information selected in step S57 is deleted from public storage area 183, and the process then proceeds to step S59. In the next step S59, all the contents stored in personal storage area 181 allocated to the authenticated user are deleted from personal storage area 181. In the next step S60, it is determined whether any content exists in the personal storage area in which the deleted contents have been stored. If no content exists in the personal storage area, the process proceeds to step S61. If even one exists, the process returns to step S42. In step S61, personal storage area 181 is deleted from HDD 116, and the process returns to step S42.

The operation of MFP 100 in meeting system 1 in the first embodiment will be described, assuming that a presenter uses PC 200 and participants A-D use PC 200A-200D, respectively. In the present case, the presenter performs an operation of storing a main material and auxiliary materials A and B stored beforehand in PC 200, into HDD 116 of MFP 100. It is assumed that the presenter sets whether to publish or not to "public" for the main material, sets whether to publish or not to "private" and an output format "moving image data format" for auxiliary material A, and sets "private" and "copy protection" for auxiliary material B.

In MFP 100, the main material is stored in public storage area 183 of HDD 116, and auxiliary materials A and B are stored in personal storage area 181 of the presenter. At this point, if a personal storage area allocated to the presenter does not exist in HDD 116, MFP 100 creates personal storage area 181 allocated to the presenter in HDD 116 and stores auxiliary materials A and B therein.

The presenter can project an image of the main material on whiteboard 221 by remotely operating MFP 100 to output the main material to projector 210. At this stage, participants A-D can remotely operate MFP 100 using PC 200A-200D, respectively, such that the main material stored in public storage area 183 of HDD 116 is downloaded to PC 200A-200D and displayed on the displays. However, participants A-D cannot access personal storage area 181 of HDD 116 allocated to the presenter and therefore cannot access auxiliary materials A and B.

The presenter may answer the question from the participant using auxiliary material A. In this case, the presenter accesses auxiliary material A stored in personal storage area 181 and allows projector 210 to display the image of auxiliary material A. Then, MFP 100 creates link information for accessing auxiliary material A and stores the same in public storage area 183. In this state, participants A-D can know the link information by operating PC 200A-200D, respectively, to access public storage area 183 of HDD 116. Since the accessing of the presenter to auxiliary material A set private enables participants A-D to access, the presenter does not have to perform an operation of setting auxiliary material A to be accessible by participants A-D. Thus, the setting operation to permit participants A-D to access auxiliary material A becomes easier.

If participant A, for example, of participants A-D, operates PC 200A to access the link information stored in public storage area 183, MFP 100 reads out auxiliary material A associated with the link information and sends auxiliary material A to PC 200. In this case, since a moving image data format is set as an output form for auxiliary material A, auxiliary material A is converted in a moving image data format, and a moving image is streamed. Therefore, participant A cannot download auxiliary material A per se to PC 200A. Thus, only reference to the image of auxiliary material A is permitted. This is effective, for example, when material A includes confidential matters.

Thereafter, if the presenter stops outputting of auxiliary material A to projector 210, the link information stored in public storage area 183 is deleted, and in addition, auxiliary material A stored in personal storage area 181 allocated to the presenter is deleted. As a result of the deletion of the link information, participants A-D can no longer refer to auxiliary material A. Thus, a period during which participants A-D can access auxiliary material A can be limited. This also eliminates the presenter having to operate to delete auxiliary material A no longer required.

Similarly, if the presenter accesses auxiliary material B stored in personal storage area 181, MFP 100 creates link information for accessing auxiliary material B and stores the same in public storage area 183. In this state, if participant A, for example, of participants A-D operates PC 200A to access the link information stored in public storage area 183, MFP 100 reads out auxiliary material B associated with the link information and sends auxiliary material B to PC 200. In this case, print protection is set as an output form for auxiliary material B, and therefore auxiliary material B having control information of print protection is sent. Accordingly, participant A can download auxiliary material B per se to PC 200A but cannot print auxiliary material B. Thus, only display of the image of auxiliary material B is permitted. As a result, the output form of auxiliary material B is limited, and for example, distribution of auxiliary material B as a printing medium can be prevented. In particular, this is effective, for example, when auxiliary material B includes confidential matters.

Thereafter, if the presenter stops access to auxiliary material B, the link information stored in public storage area 183 is deleted, and in addition, auxiliary material B stored in personal storage area 181 allocated to the presenter is deleted. As a result of deletion of the link information, participants A-D can no longer refer to auxiliary material B. In addition, since content no longer exists in personal storage area 183, the personal storage area is deleted from HDD 116. This eliminates the presenter having to operate to delete the personal storage area no longer required.

Here, auxiliary material A and the link information for accessing it are deleted when the presenter stops access to auxiliary material A. However, they may not be deleted. In such a case, the access to auxiliary material A by the presenter is equivalent to an instruction to permit publishing, and participants A-D, once permitted to access, can obtain auxiliary material A. Although here publishing is permitted when auxiliary materials A and B stored in personal storage area 181 are accessed, publishing may also be permitted when auxiliary materials A and B are selected. Furthermore, a key that enables collective publishing may be provided so that publishing of the auxiliary materials A and B stored in personal storage area 181 is permitted altogether at a time.

Second Embodiment

In MFP 100 in the first embodiment, when content stored in personal storage area 181 is set public, link information for accessing the content is stored in public storage area 183 so that other users can access the link information to have the content output. In MFP 100 in the second embodiment, content per se is stored in public storage area 183 without using link information. An overall configuration of meeting system 1 in the second embodiment is the same as that shown in FIG. 1. The hardware configuration of MFP 100 in the second embodiment is the same as that shown in FIG. 2. Therefore, a description thereof will not be repeated here.

Figure 9:
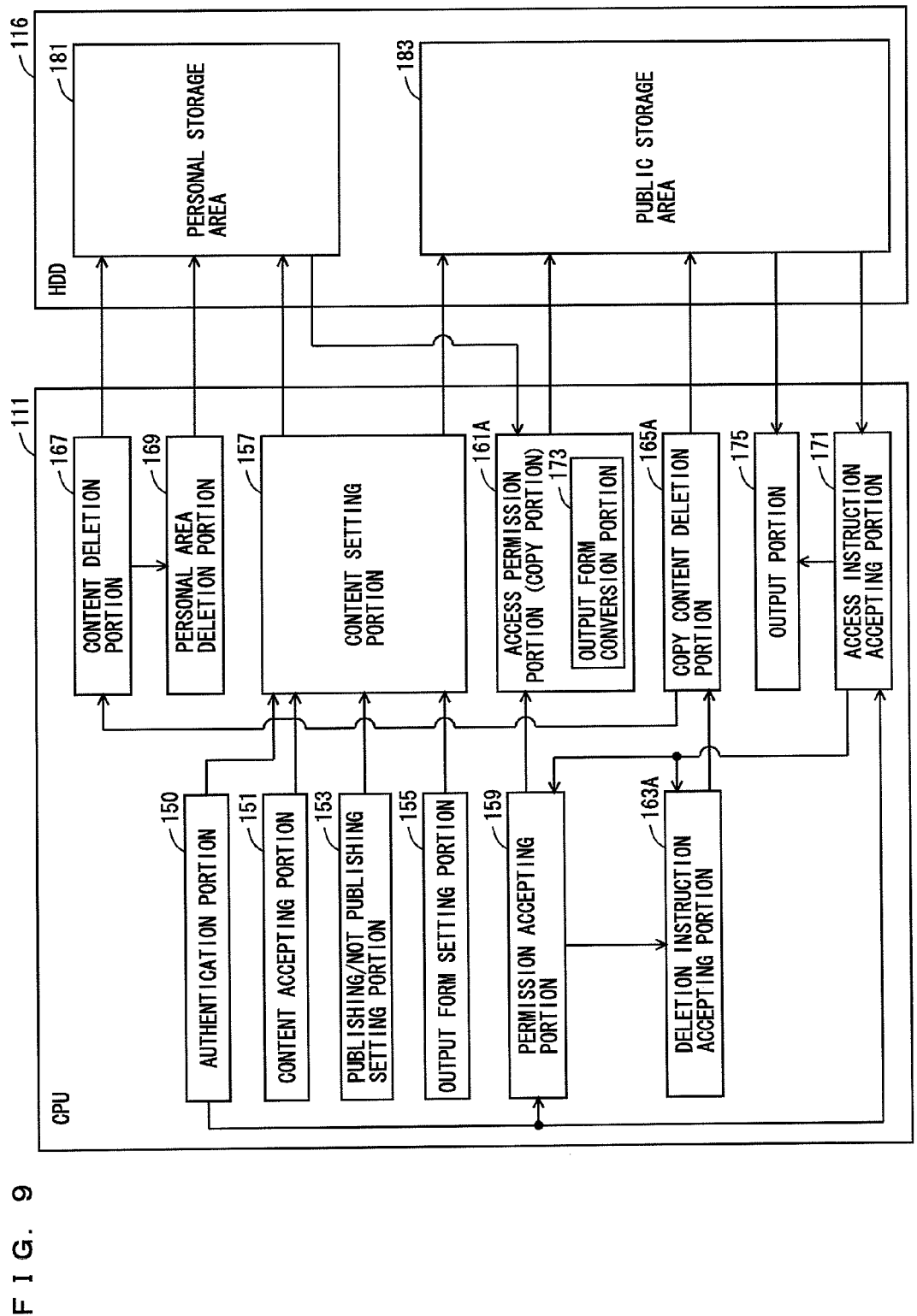
FIG. 9 is a block diagram showing an example of functions configured in CPU included in the MFP in accordance with a second embodiment.

FIG. 9 is a block diagram showing an example of functions configured in CPU of MFP in the second embodiment. FIG. 9 differs from the block diagram in FIG. 3 in that access permission portion 161 is changed to access permission portion 161A, output form conversion portion 173 is included in an access permission portion 161A, deletion instruction accepting portion 163 is changed to a deletion instruction accepting portion 163A, and link information deletion portion 165 is changed to a copy content deletion portion 165A. The other functions are the same as those shown in FIG. 3 and therefore a description thereof will not be repeated here.

Output form conversion portion 173 included in access permission portion 161A receives content identification information from access instruction accepting portion 171, and if content specified by the received content identification information is associated with an output form, then reads the content and converts the read content into the output form associated therewith. If the output form associated with the content is access restriction on content, access restriction is imposed on the content. Specifically, if access restriction is print protection, the content is converted into content with control information of print protection. If access restriction is copy protection, the content is converted into content with control information of copy protection. If access restriction is write protection for content, the content is converted into content with control information of write protect. On the other hand, if the output form associated with the content is a data format, the content is converted into that data format. For example, if the content is in a still image data format and the output form is a moving image data format, the still image of the content is converted into a moving image data format.

Access permission portion 161A accepts access permission from permission accepting portion 159 to store the content converted by output form conversion portion 173 into public storage area 183 of HDD 116. Since public storage area 183 can be accessed by a plurality of users, any user who is authenticated by authentication portion 150 can access content stored in public storage area 183. Here, the content stored in public storage area 183 is content having the converted output form.

Deletion instruction accepting portion 163A receives an output stop signal from access instruction accepting portion 171 to specify content specified by the content identification information included in the input output stop signal from among the contents stored in public storage area 183 of HDD 116 and then output the content identification information of the specified content to copy content deletion portion 165A. Deletion instruction accepting portion 163A also accepts an instruction to select and delete the content stored in public storage region 183 from PC 200 used by the user to remotely operate MFP 100 or from operation portion 129B to output the content identification information of the selected content to copy content deletion portion 165A.

In response to input of the content identification information, copy content deletion portion 165A deletes the content specified by the content identification information from public storage area 183 and also outputs a content deletion instruction including the content identification information of the deleted content to content deletion portion 167.

Figure 10:
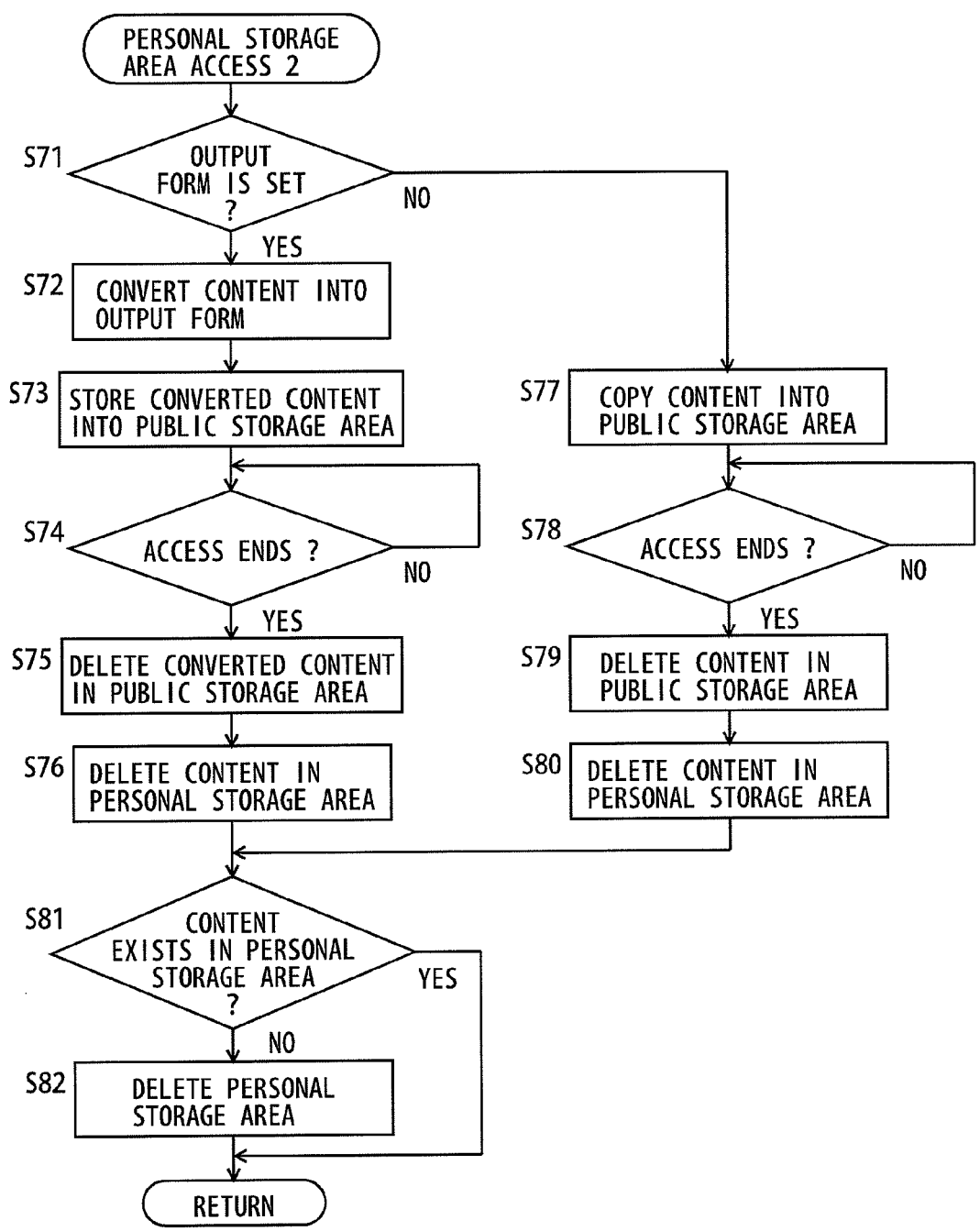
FIG. 10 is a flowchart showing an exemplary flow of a link information access process in the second embodiment.

In CPU 111 of MFP 100 in the second embodiment, the content management process shown in FIG. 4 is executed. FIG. 10 is a flowchart showing an exemplary flow of a personal storage area access process in the second embodiment. The personal storage area access process is a process which is executed in step S12 of the content management process shown in FIG. 4 and which is executed when content stored in personal storage area 181 is accessed. Referring to FIG. 10, CPU 111 determines whether an output form is set for the accessed content (step S71). If an output form is set, the process proceeds to step S72. If not, the process proceeds to step S77.

In step S72, the content is converted into the output form set for that content. The content having the converted output form is referred to as the converted content hereinafter. In the next step S73, the converted content is stored in public storage area 183. In the next step S74, it is determined whether the access to the content ends. The process waits until the access to the content ends (NO in step S74). When the access ends, the process proceeds to step S75.

In step S75, the converted content stored in the public storage area in step S73 is deleted. The converted content is stored in public storage area 183 while the authenticated user is accessing the content stored in personal storage area 181 allocated to that user, so that other users can access the converted content. When the authenticated user ends access to the content stored in personal storage area 181, the converted content stored in the public storage area is deleted. Therefore, after the authenticated user ends access to the content, other users cannot access the converted content. In the next step S76, the content is deleted from personal storage area 181, and the process then proceeds to step S81.

On the other hand, in step S77, the content is copied and stored in public storage area 183. In the next step S78, it is determined whether the access to the content ends. The process waits until the access to the content ends (NO in step S78). When the access ends, the process proceeds to step S79.

In step S79, the content stored in the public storage area in step S77 is deleted. The content is stored in public storage area 183 while the authenticated user is accessing the content stored in personal storage area 181 allocated to that user, so that other users can access the content. When the authenticated user ends access to the content stored in personal storage area 181, the content stored in the public storage area is deleted. Therefore, after the authenticated user ends access to the content, other users cannot access the content. In the next step S80, the content is deleted from personal storage area 181, and the process then proceeds to step S81.

In the next step S81, it is determined whether there exists content in the personal storage area from which content has been deleted in step S76 or step S80. If no content exists, the process proceeds to step S82. If even one content exists, the process skips step S82 and returns to the content management process. In step S82, personal storage area 181 is deleted from HDD 116, and the process then returns to the content management process.

Figure 11:
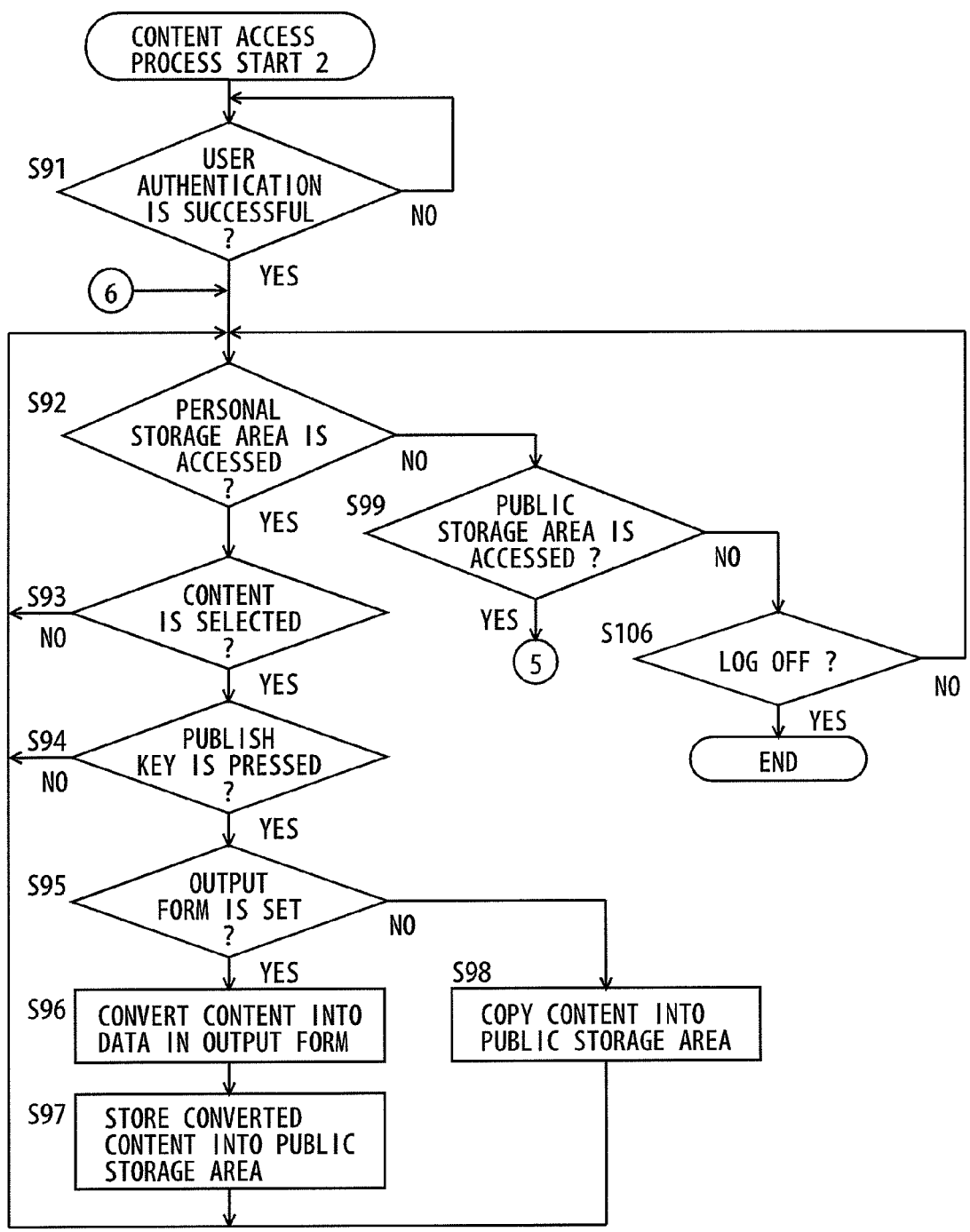
FIG. 11 is a first flowchart showing an exemplary flow of a content access process in the second embodiment.
Figure 12:
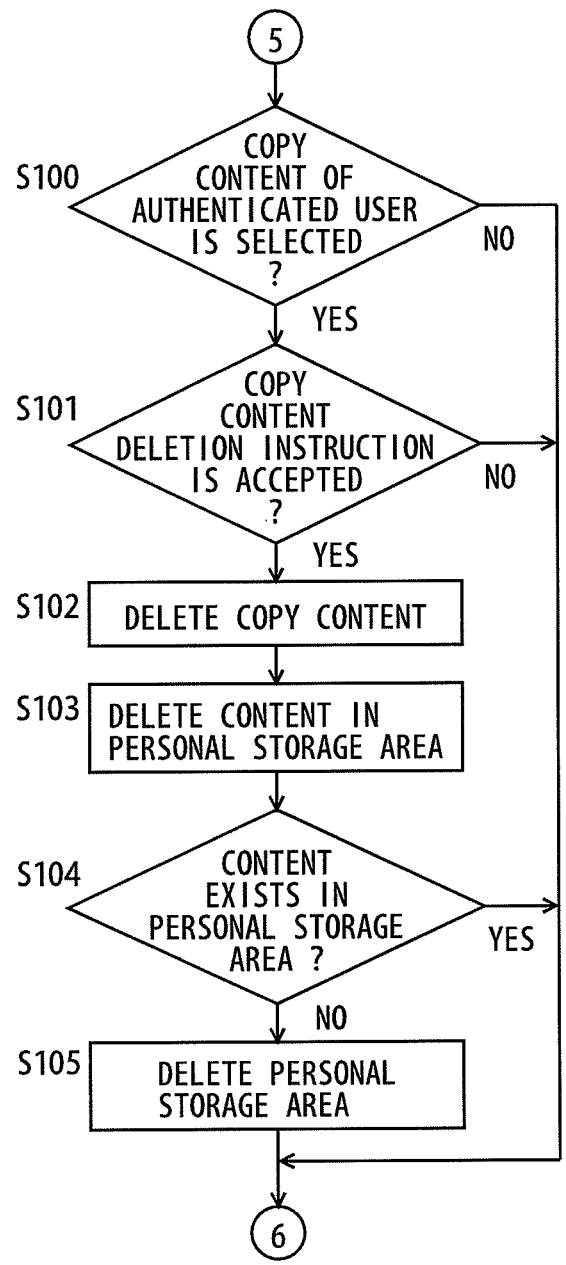
FIG. 12 is a second flowchart showing an exemplary flow of a content access process in the second embodiment.

FIG. 11 and FIG. 12 are flowcharts showing an exemplary flow of a content access process in the second embodiment. The content access process is a process executed by CPU 111 executing the content management program stored in ROM 113 or flash memory 119A. Referring to FIG. 11 and FIG. 12, CPU 111 determines whether user authentication is successful. The process waits until user authentication is successful (NO in step S91). If user authentication is successful, the process proceeds to step S92. In other words, in the content access process, the process following step S92 is executed on condition that user authentication is successful.

In the next step S92, it is determined whether the authenticated user accesses the personal storage area allocated to that user. If the user accesses the personal storage area, the process proceeds to step S93. If not, the process proceeds to step S99. In step S99, it is determined whether the authenticated user accesses public storage area 183 of HDD 116. If the user accesses public storage area 183, the process proceeds to step S100. If not, the process proceeds to step S106. In step S106, it is determined whether the authenticated user inputs a log-off operation. If the user inputs a log-off operation, the process ends. If not, the process returns to step S92.

In other words, the process in step S93 to step S98 is executed if the authenticated user accesses personal storage area 181, the process in step S100 to step S105 is executed if the authenticated user accesses public storage area 183, and the process ends if the authenticated user inputs a log-off operation.

In step S93, it is determined whether content stored in personal storage area 181 is selected. If content is selected, the process proceeds to step S94. If not, the process returns to step S92. In step S94, it is determined whether the publish key is pressed. If the publish key is pressed, the process proceeds to step S95. If not, the process returns to step S92. In step S95, an output form is set for the selected content. If an output form is set, the process proceeds to step S96. If not, the process proceeds to step S98.

In step S96, the content is converted into the output form set for that content. The content having the converted output form will be referred to as the converted content hereinafter. In the next step S97, the converted content is stored in public storage area 183, and the process then returns to step S92. On the other hand, in step S98, the content is stored in public storage area 183, and the process then returns to step S92. The converted content stored in public storage area 183 in step S96 and the content stored in public storage area 183 in step S98 will be collectively referred to as copy content hereinafter.

In step S100, it is determined whether the copy content of the user authenticated in step S91 is selected. If the copy content of the authenticated user is selected, the process proceeds to step S101. If not, the process returns to step S92. In step S101, it is determined whether an instruction to delete the copy content is accepted. If an instruction to delete the copy content is accepted, the process proceeds to step S102. If not, the process returns to step S92. In step S102, the copy content selected in step S100 is deleted from public storage area 183.

In the next step S103, the content that corresponds to the copy content and is stored in personal storage area 181 allocated to the authenticated user is deleted from personal storage area 181, and the process then proceeds to step S104. In the next step S104, it is determined whether there exists content in the personal storage area from which the content has been deleted in step S103. If no content exists, the process proceeds to step S105. If even one content exists, the process skips step S105 and returns to step S92. In step S105, personal storage area 181 is deleted from HDD 116, and the process then returns to step S92.

The operation of MFP 100 in meeting system 1 in the second embodiment will be described, assuming that the presenter uses PC 200 and participants A-D use PC 200A-200D, respectively. In the present case, the presenter performs an operation of storing a main material and auxiliary materials A and B stored beforehand in PC 200, into HDD 116 of MFP 100. It is assumed that the presenter sets whether to publish or not to "public" for the main material, sets whether to publish or not to "private" and an output format "moving image data format" for auxiliary material A, and sets "private" and "copy protection" for auxiliary material B.

In MFP 100, the main material is stored in public storage area 183 of HDD 116, and auxiliary materials A and B are stored in personal storage area 181 of the presenter. At this point, if a personal storage area allocated to the presenter does not exist in HDD 116, MFP 100 creates personal storage area 181 allocated to the presenter in HDD 116 and stores auxiliary materials A and B therein.

The presenter can project an image of the main material on whiteboard 221 by remotely operating MFP 100 to output the main material to projector 210. At this stage, participants A-D can remotely operate MFP 100 using PC 200A-200D, respectively, such that the main material stored in public storage area 183 of HDD 116 is downloaded to PC 200A-200D and displayed on the displays. However, participants A-D cannot access personal storage area 181 of HDD 116 allocated to the presenter and therefore cannot access auxiliary materials A and B.

The presenter may answer the question from the participant using auxiliary material A. In this case, the presenter accesses auxiliary material A stored in personal storage area 181 and allows projector 210 to display the image of auxiliary material A. Then, MFP 100 copies auxiliary material A converted in accordance with the output form, for storage into public storage area 183. As a moving image data format is set as the output form for auxiliary material A, auxiliary material A converted in a moving image data format is stored in public storage area 183. In this state, participants A-D can learn about auxiliary material A by operating PC 200A-200D, respectively, and accessing public storage area 181 of HDD 116. If participant A, for example, of participants A-D, operates PC 200A to access auxiliary material A stored in public storage area 183, MFP 100 reads out auxiliary material A and sends auxiliary material A to PC 200. In this case, auxiliary material A, which has a moving image data format, is streamed. Therefore, participant A cannot download auxiliary material A per se to PC 200A. Only reference to the image is permitted. This is therefore effective, for example, when auxiliary material A includes confidential matters.

Thereafter, if the presenter stops outputting of auxiliary material A to projector 210, auxiliary material A stored in public storage area 183 is deleted, and in addition, auxiliary material A stored in personal storage area 181 allocated to the presenter is deleted. As a result of the deletion of auxiliary material A, which is copy content, from public storage area 183, participants A-D can no longer refer to auxiliary material A. This also eliminates the presenter having to operate to delete auxiliary material A no longer required from personal storage area 181.

Similarly, if the presenter accesses auxiliary material B stored in personal storage area 181, MFP 100 stores auxiliary material B with control information of copy protection, as copy content, in public storage area 183. In this state, if participant A, for example, of participants A-D operates PC 200A to access auxiliary material B stored in public storage area 183, MFP 100 reads out auxiliary material B and sends auxiliary material B to PC 200. In this case, control information of print protection is added to auxiliary material B, and therefore, participant A can download auxiliary material B per se to PC 200A but cannot print auxiliary material B. Thus, only display of the image is permitted. As a result, distribution of auxiliary material B as print media can be prevented, and this is effective in particular, for example, when auxiliary material B includes confidential matters.

Thereafter, if the presenter stops access to auxiliary material B, auxiliary material B stored in public storage area 183 is deleted, and in addition, auxiliary material B stored in personal storage area 181 allocated to the presenter is also deleted. As a result of the deletion of auxiliary material B stored in public storage area 183, participants A-D can no longer refer to auxiliary material B. This also eliminates the presenter having to operate to delete auxiliary material B no longer required. In addition, since content no longer exists in personal storage area 183, the personal storage area is deleted from HDD 116. This eliminates the presenter having to operate to delete the personal storage area no longer required.

Here, auxiliary material A or auxiliary material B stored in public storage area 183 as well as auxiliary material A or auxiliary material B stored in personal storage area 181 is deleted when the presenter stops access to auxiliary material A or auxiliary material B. However, they may not be deleted. In such a case, the access to auxiliary material A by the presenter is equivalent to an instruction to permit publishing, and participants A-D, once permitted to access, can obtain auxiliary material A. Although here publishing is permitted if auxiliary materials A and B stored in personal storage area 181 are accessed, publishing may also be permitted if auxiliary materials A and B are selected. Furthermore, a key that enables collective publishing may be provided so that publishing of the auxiliary materials A and B stored in personal storage area 181 can be permitted altogether at a time.

In the foregoing first and second embodiments, if a plurality of contents exist in public storage area 183 of HDD 116, when participants A-D access public storage area 183, the respective content identification information of the plurality of contents are displayed. Thus, the operation of looking for the content to be presented is cumbersome. Then, only the content identification information of the content created by the presenter may be displayed at a stage when public storage area 183 is accessed.

Although MFP 100 has been described as an exemplary information processing apparatus in the foregoing embodiments, it is needless to say that the present invention can be understood as a content management method that allows MFP 100 to execute the process illustrated in FIG. 4 to FIG. 8 or FIG. 11 to FIG. 12 and as a content management program for allowing CPU 111 controlling MFP 100 to execute the content management method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information processing apparatus comprising:
a storage portion having a plurality of storage areas; and
a processor that is connected to the storage portion and that:
   determines whether a user is authenticated,
   stores content set private by the authenticated user into a personal storage area accessible only by the authenticated user, of the plurality of storage areas of the storage portion,
   stores content not set private into a public storage area with no access restriction, of the plurality of storage areas of the storage portion,
   detects that the authenticated user accesses the content set private stored in the personal storage area,
   based on an event of detecting that the authenticated user accesses the content set private, stores into the public storage area data corresponding to the content set private stored in the personal storage area, and
   during a time when the authenticated user accesses the content set private is detected, based on an event of detecting that the data stored in the public storage area is accessed, allows a user other than the authenticated user to use the content set private.

2. The information processing apparatus according to claim 1, wherein the processor stores as data corresponding to the content set private into said public storage area link information that allows others to access the content set private stored in said personal storage area.

3. The information processing apparatus according to claim 2, wherein the processor deletes the link information stored in said public storage area in a case where the detection that the authenticated user accesses the content set private ends.

4. The information processing apparatus according to claim 2, wherein the processor:
sets an output form for said content,
converts said content into said set output form, and
outputs said converted content.

5. The information processing apparatus according to claim 2, wherein the processor, in response to deletion of the link information stored in said public storage area by said authenticated user, deletes the content stored in said personal storage area that is linked by the link information.

6. The information processing apparatus according to claim 5, wherein the processor deletes said personal storage area in response to deletion of all the contents stored in said personal storage area.

7. The information processing apparatus according to claim 1, wherein the processor copies into said public storage area the content set private stored in said personal storage area.

8. The information processing apparatus according to claim 7, wherein the processor deletes copy content copied into said public storage area in a case where the detection that the authenticated user accesses the content set private ends.

9. The information processing apparatus according to claim 7, wherein the processor sets an output form for said content and converts said content into said set output form.

10. The information processing apparatus according to claim 1, wherein the processor:
accepts content, and
sets said accepted content either public or private, and
generates said personal storage area allocated to said authenticated user when said accepted content is set private.

11. A content management method executed in an information processing apparatus including a storage portion having a plurality of storage areas, comprising:
determining whether a user is authenticated;
storing content set private by the authenticated user into a personal storage area accessible only by the authenticated user, of the plurality of storage areas of the storage portion;
storing content not set private into a public storage area with no access restriction, of the plurality of storage areas of the storage portion;
detecting that the authenticated user accesses the content set private stored in the personal storage area;
based on an event of detecting that the authenticated user accesses the content set private, storing into the public storage area data corresponding to the content set private stored in the personal storage area; and
during a time when the authenticated user accesses the content set private is detected, based on an event of detecting that the data stored in the public storage area is accessed, allowing a user other than the authenticated user to use the content set private.

12. A computer-readable non-transitory recording medium encoded with a content management program executed in a computer which controls an information processing apparatus including a storage portion having a plurality of storage areas, said content management program causing said computer to:
determine whether a user is authenticated;
store content set private by the authenticated user into a personal storage area accessible only by the authenticated user, of the plurality of storage areas of the storage portion;
store content not set private into a public storage area with no access restriction, of the plurality of storage areas of the storage portion;
detect that the authenticated user accesses the content set private stored in the personal storage area;
based on an event of detecting that the authenticated user accesses the content set private, store into the public storage area data corresponding to the content set private stored in the personal storage area; and
during a time when the authenticated user accesses the content set private is detected, based on an event of detecting that the data stored in the public storage area is accessed, allow a user other than the authenticated user to use the content set private.

* * * * *